(12) United States Patent
Kido et al.

(10) Patent No.: US 6,390,124 B1
(45) Date of Patent: May 21, 2002

(54) FUEL INLET AND MANUFACTURING METHOD THEREOF

(75) Inventors: Tsuguo Kido, Toyota; Tetsuji Omori, Okazaki; Keiichi Yamamoto, Okazaki; Masayuki Sugiura, Okazaki; Yuji Nakada, Okazaki; Seiji Yamamoto, Okazaki; Toyohisa Kawabe, Okazaki, all of (JP)

(73) Assignee: Futaba Industrial Co. Ltd., Okazaki ( * ) Notice: Subject to any disclaimer, the term of this patent is extended or adjusted under 35 U.S.C. 154(b) by 0 days.

(21) Appl. No.: 09/630,417

(22) Filed: Aug. 1, 2000

(30) Foreign Application Priority Data

Aug. 6, 1999 (JP) .......................... 11-224022
Aug. 26, 1999 (JP) ......................... 11-239693

(51) Int. Cl.[7] ............................. F02M 33/02
(52) U.S. Cl. .................. 137/588; 137/587; 123/516
(58) Field of Search .................. 123/516; 137/588, 137/587

(56) References Cited

U.S. PATENT DOCUMENTS 4,651,889 A * 3/1987 Uranishi et al. .......... 220/86.2
4,809,865 A * 3/1989 Mori et al. ............... 220/86.2
5,769,057 A * 6/1998 Hashimoto et al. ........ 123/516

FOREIGN PATENT DOCUMENTS

JP          6-259       1/1994
JP          9-39591     2/1997

* cited by examiner

Primary Examiner—A. Michael Chambers
(74) Attorney, Agent, or Firm—Davis & Bujold, P.L.L.C.

(57) ABSTRACT

A fuel inlet comprises an inlet pipe, a breather tube, a retainer, a spiral groove, and the like. The inlet pipe is formed by processing a metal pipe and has an expanded portion, a taper portion, and a main body in the order from the fuel port. The expanded portion is formed by increasing the diameter by bulging. In order to prevent defects in the pipe such as cracks from being caused during bulging, SUS304, SUS304L, or SUS436 according to JIS is used as the material of the pipe. The diameter of the main body is 25.4 mm and the diameter of the expanded portion is 50 mm. A spiral groove on which a screw-type fuel port cap can be screwed is formed in the vicinity of the open end of the expanded portion, by crimping the inlet pipe and the retainer together. On the outer surface of the expanded portion in the vicinity of the open end is provided an outer-cylinder-like flange formed integrally with the inlet pipe.

17 Claims, 30 Drawing Sheets

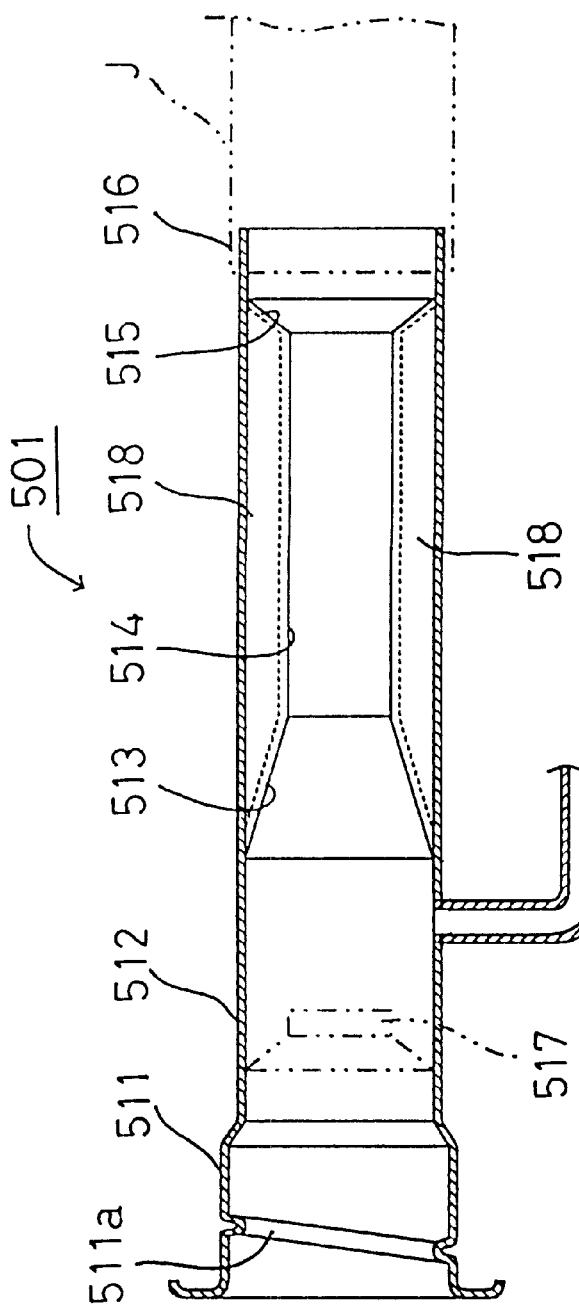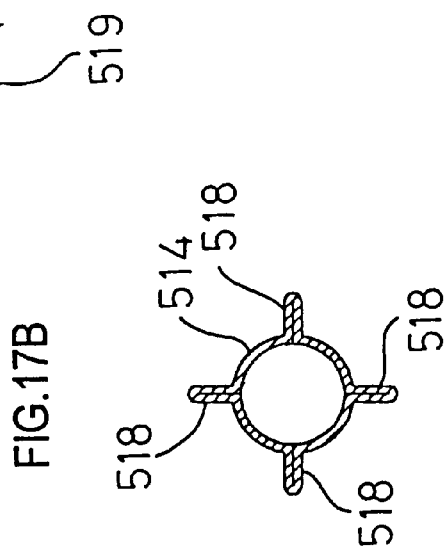

FUEL INLET AND MANUFACTURING METHOD THEREOF

FIELD OF THE INVENTION

The present invention relates to a fuel inlet for pouring fuel into a fuel tank of a car and the like, and a manufacturing method thereof.

BACKGROUND OF THE INVENTION

Generally, when pouring fuel such as gasoline into a fuel tank of a car and the like, a fuel inlet 701 as shown in FIG. 31 is used. A connecting pipe J is fixed to the end of the fuel inlet 701 on the fuel tank side, and a breather tube 703 communicating with the fuel tank T is provided in the vicinity of a fuel port 701a of the fuel inlet 701. At the time of fueling, a not shown fuel feeding nozzle is inserted into the fuel inlet 701 through the fuel port 701a and fuel is fed into the fuel tank T through the fuel inlet 701 and the connecting pipe J. When fuel feed into the fuel tank T starts, the air in the fuel tank T is pushed toward the fuel port 701a of the fuel inlet 701 through the breather tube 703. When fuel feed continues and a certain amount of the fuel is stored in the fuel tank T, the internal pressure of the fuel tank T increases and causes the fuel feed nozzle to automatically stop, and further automatic feeding is impossible. A person who feeds fuel notices it and shifts the feeding into manual operation, and additionally pours a small amount of gasoline two to three times before finishing the feeding.

The above process involves a problem that since the air pushed toward the fuel port while the feeding contains a high density of fuel vapor, careless emission thereof into the atmosphere leads to an increase of fuel density around and thus unfavorable effects on the environment.

To solve this problem, it is proposed to employ a fuel inlet 801 shown in FIG. 32. The fuel inlet 801 is provided with a relatively small diameter portion 806 within its fuel passage. Since a space 807 shown in cross section of the passage, when fuel fed at a specific rate passes the relatively small diameter portion 806, is made smaller than in a conventional fuel inlet, venturi vacuum is generated and negative pressure in the space 807 is increased. As a result, the air returning toward the fuel port from the fuel tank through the breather tube 803 is effectively prevented from being emitted into the atmosphere. This is called a liquid seal, which is one of the means in Onboard Refueling Vapor Recovery systems, or ORVRs.

However, if the fuel inlet 801 having a relatively small diameter portion 806 of $\phi$ 25.4 mm, for example, is produced as a solid one by pressing a blank pipe instead of connecting a plurality of members, one end of the blank pipe of $\phi$ 25.4 mm, i.e. the fuel port should be expanded to $\phi$ 48 mm to 60 mm, and such a large expansion often causes cracking. Also it is required that the breather tube 803 and the inlet pipe 802 be connected easily and securely and that a spiral groove be easily formed around the expanded end of the inlet pipe to allow a cap to be screwed thereon.

A fuel inlet, having a double structure in the vicinity of the fuel port formed by folding one end of the pipe inward, is known as disclosed in the Publication of Japanese Unexamined Patent Application No. 9-39591(Cf. FIG. 33B). This type of fuel inlet 901 obtains enough strength because of the double structure in the vicinity of the fuel port and has a great durability against abrasion due to opening/closing operation of the fuel port cap.

The above fuel inlet 901 is formed as follows: Firstly, as shown in FIG. 33A, a first taper portion 901a and a second taper portion 901b are formed. Secondly, the first taper portion 901a and the second taper portion 901b are folded back to the inside of the pipe (See dotted lines in FIG. 33A) by applying pressure P in the axial direction onto the open end of the second taper portion 901b. Then, the folded end is expanded and a groove 901c is formed. By forming the first taper portion 901a and the second taper portion 901b having different cone angles, respectively, and folding these taper portions, the bending region can be prevented from being applied an excessive load thereto.

Although the fuel inlet 901, wherein a double structure is provided in the vicinity of the fuel port by folding back the end of the pipe, is quite useful, it involves a problem that the manufacturing process thereof is complicated. These days a fuel inlet is sometimes provided with a retainer having an interference portion, but it makes the manufacturing process further complicated to produce such an inlet according to the method disclosed in the Publication of Japanese Unexamined Patent Application No. 9-39591. Attaching a separate retainer to the folded end is practical, and a synthetic resin retainer which is usually more expensive than a metal one is fixed in because it is difficult to attach a metal retainer to the folded end by crimping or welding.

Also known is a structure, as shown in FIG. 34, wherein a fuel inlet 1001 is forced and fixed into a fuel inlet supporting hole 1015 provided in a car body B (See Publication of Japanese Examined Utility Model Application No. 6-259, for example). Specifically, the fuel inlet 1001 having a synthetic resin cylindrical cover 1005 fitted on the outer circumference in the vicinity of the fuel port is forced into the fuel inlet supporting hole 1015 from the side of a fuel tank T, thereby the cylindrical cover 1005 is pressed against the fuel inlet supporting hole 1015.

Since this structure enables relative movement between the car body B and the fuel inlet 1001, even if a heavy load is applied to the car body B, for example, the car body B yields or bulges independently of the fuel inlet 1001, and therefore the heavy load does not directly affect the fuel inlet 1001. Furthermore, even if the car body B is deformed to bulge toward the fuel inlet 1001, the bulging region does not cause the fuel port cap C to be pushed up and removed because the outer diameter of the fuel port cap C is designed to be smaller than the outer diameter of the cylindrical cover 1005.

The structure in FIG. 34, however, has a problem that the cylindrical cover 1005 made of synthetic resin leads to the higher cost of materials, which makes the cost for fixing the fuel inlet 1001 increased. Also, the cylindrical cover 1005 used as a separate member needs to be produced separately as well as requires another process step of attaching the same to the fuel inlet 1001, and as a result the cost for fixing the fuel inlet 1001 is further increased Moreover, this structure requires a retaining mechanism for preventing the cylindrical cover 1005 from being displaced axially relative to the fuel inlet 1001 when the fuel inlet 1001 with the cylindrical cover 1005 wrapped therearound is forced into the fuel inlet supporting hole 1015. Specifically, as shown in FIG.34, the retaining mechanism is constituted by a bead 1001a provided on the outer circumference of the fuel inlet 1001 and a groove 1005a provided on the internal circumference of the cylindrical cover 1005 for catching the bead 1001a. This type of retaining mechanism complicates the structure of the fuel inlet 1001 and impedes production thereof.

SUMMARY OF THE INVENTION

Wherefore, a principal object of the present invention is to provide a fuel inlet which has a liquid seal function and whose production requires only a small number of parts and also is easy.

Another object of the present invention is to provide a fuel inlet which has a double structure in the vicinity of its fuel port and is easy to make.

Further object of the present invention is to provide a fuel inlet having a simple structure and not requiring high cost of fixing the same to a car body such that relative movement is allowed therebetween.

According to the first phase of the present invention, the fuel inlet comprises: an inlet pipe for guiding fuel into a fuel tank and a breather tube for letting the air out of the fuel tank toward the forward end portion of the inlet pipe while feeding fuel, one end of the inlet pipe being expanded to have a diameter one and a half to three times as large as the diameter of the body of the inlet pipe, and also being provided with a spiral groove directly formed therein, for engaging with a cap, an open end of the breather tube joined to the forward end portion of the inlet pipe being provided with a flange, which is projection welded on the area around a hole provided in the forward end portion of the inlet pipe.

The fuel inlet of the present invention is preferably made of a material selected from SUS304, SUS304L, SUS436 according to JIS, and their equivalents.

According to another phase of the present invention, the fuel inlet comprises: an inlet pipe for guiding fuel into a fuel tank; a cylindrical reinforcement overlapping the inner circumference of the inlet pipe in the vicinity of the fuel port thereof; and a screw portion for screwing a fuel port cap thereon formed by crimping the inlet pipe and the cylindrical reinforcement.

According to a further phase of the present invention, the fuel inlet is forced and fixed in a fuel inlet supporting hole provided in a car body such that relative movement between said fuel inlet and the car body is allowed. The fuel inlet comprises: an extending portion extending radially outward from the edge of an inlet pipe on the side where a fuel port cap is screwed; and an outer-cylinder-like flange adjoining the extending portion and having a configuration formed by being folded back in the axial direction of the inlet pipe, the outer-cylinder-like flange being fixed tight in the fuel inlet supporting hole when forced thereinto.

According to a still further phase of the present invention, the fuel inlet having liquid seal function comprises: a relatively large diameter portion formed on the side of a fuel port; and a relatively small diameter portion formed integrally with the relatively large diameter portion on the side of a fuel tank, the relatively small diameter portion having a diameter smaller than the relatively large diameter portion by being provided with a plurality of elongate protrusions having a configuration of being pinched from the outside.

BRIEF DESCRIPTION OF THE DRAWINGS

The present invention will now be described, by way of example, with reference to the accompanying drawings, in which:

FIG. 17A is a cross-sectional view of the fuel inlet taken along line 17A—17A of FIG. 16;

FIG. 17B is a cross-sectional view of the fuel inlet taken along line 17B—17B of FIG. 16;

DETAILED DESCRIPTION OF THE PREFERRED EMBODIMENTS

First Embodiment

In this embodiment, a fuel inlet is produced by expanding part of a pipe.

Figure 1:
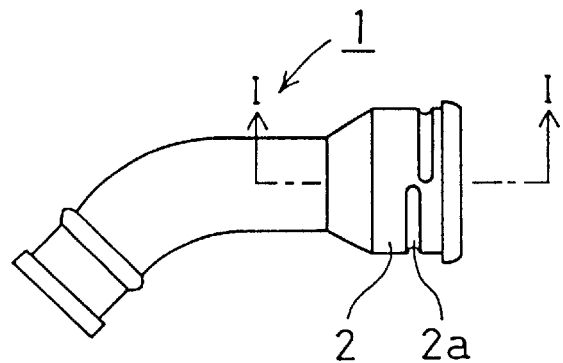
FIG. 1 is a front view showing the expanded portion of a fuel inlet according to a first preferred embodiment of the present invention.
Figure 2:
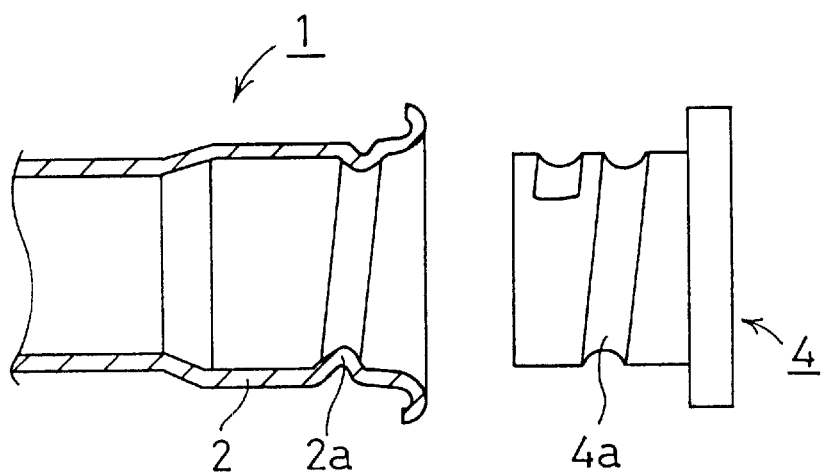
FIG. 2 is a cross-sectional view taken along line I—I of FIG. 1.

A fuel inlet 1 according to the present embodiment shown in FIGS. 1 and 2 is provided with a spiral groove 2a formed in a expanded portion 2 thereof. The expanded portion 2 is formed by increasing the diameter of an end by bulging.

The fuel inlet 1 is used for pouring fuel such as gasoline into a fuel tank of a car and the like. Except when fuel is being poured, the opening of the fuel inlet 1 is closed by screwing a cap 4 (see FIG. 2) having a screw portion 4a engageable with the spiral groove 2a.

It will be described how the fuel inlet 1 such as the above is produced with reference to FIGS. 3 and 4.

Figure 3:
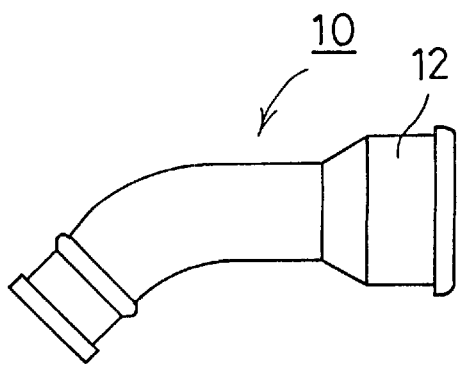
FIG. 3 is a front view of a pipe before forming a spiral groove therein.

Firstly required is a blank pipe 10 shown in FIG. 3, which has an expanded portion 12 formed by increasing the diameter of one end thereof by bulging, the end of the expanded portion 12 being flared. The material of the pipe 10 is, for example, SUS304, SUS304L or SUS436 according to Japanese Industrial Standards or JIS. The diameter of the pipe 10 is 25.4 mm to 35 mm, and the diameter of the expanded portion 12 is 48 mm to 60 mm. In the present embodiment, very malleable SUS304, SUS304L or SUS436 is employed to prevent cracks during bulging by which the diameter of the pipe is increased about two and a half times. Another reason for employing a stainless pipe such as the above is to prevent rust.

Figure 4:
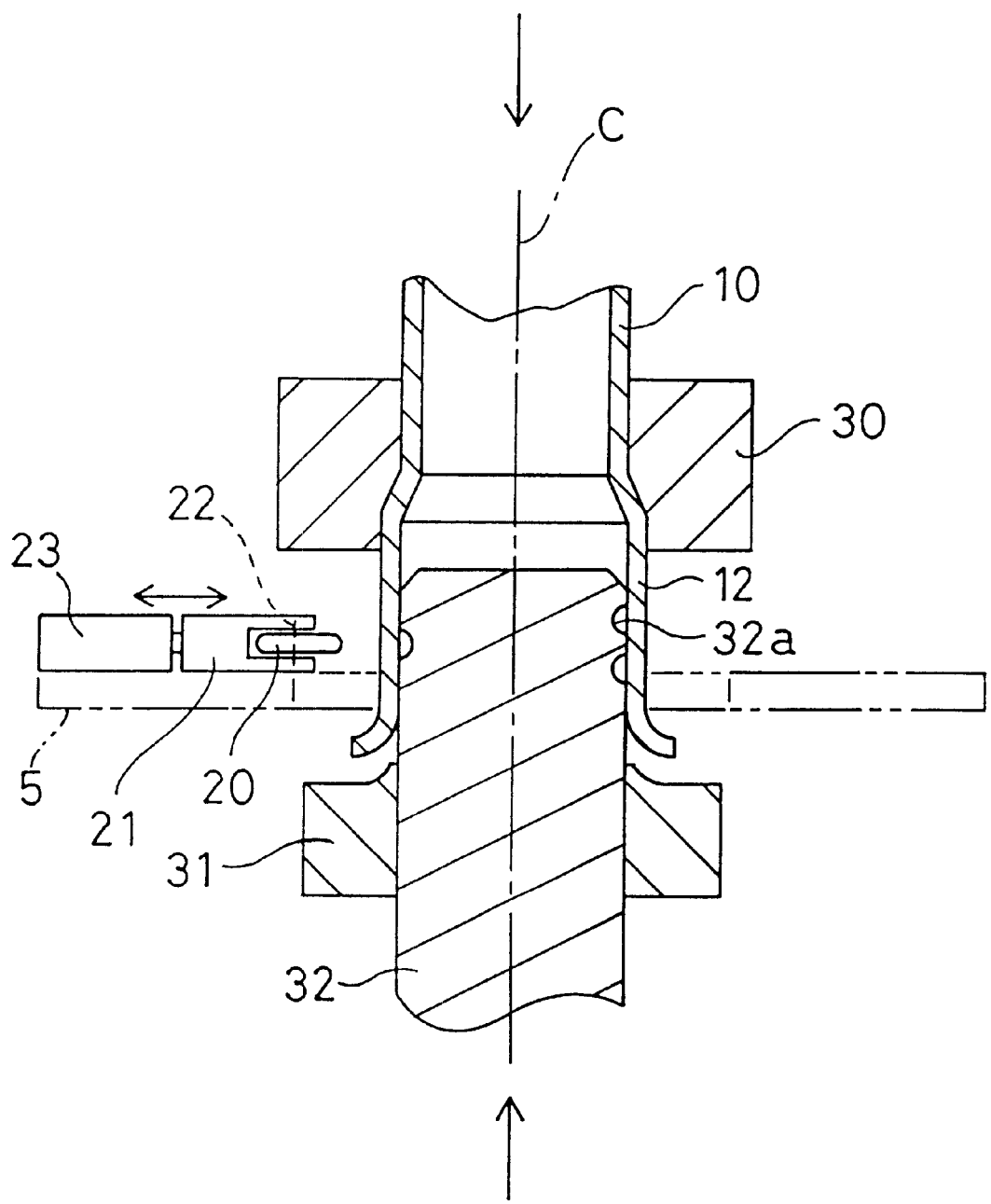
FIG. 4 is an explanatory view showing how to form the spiral groove.
Figure 5:
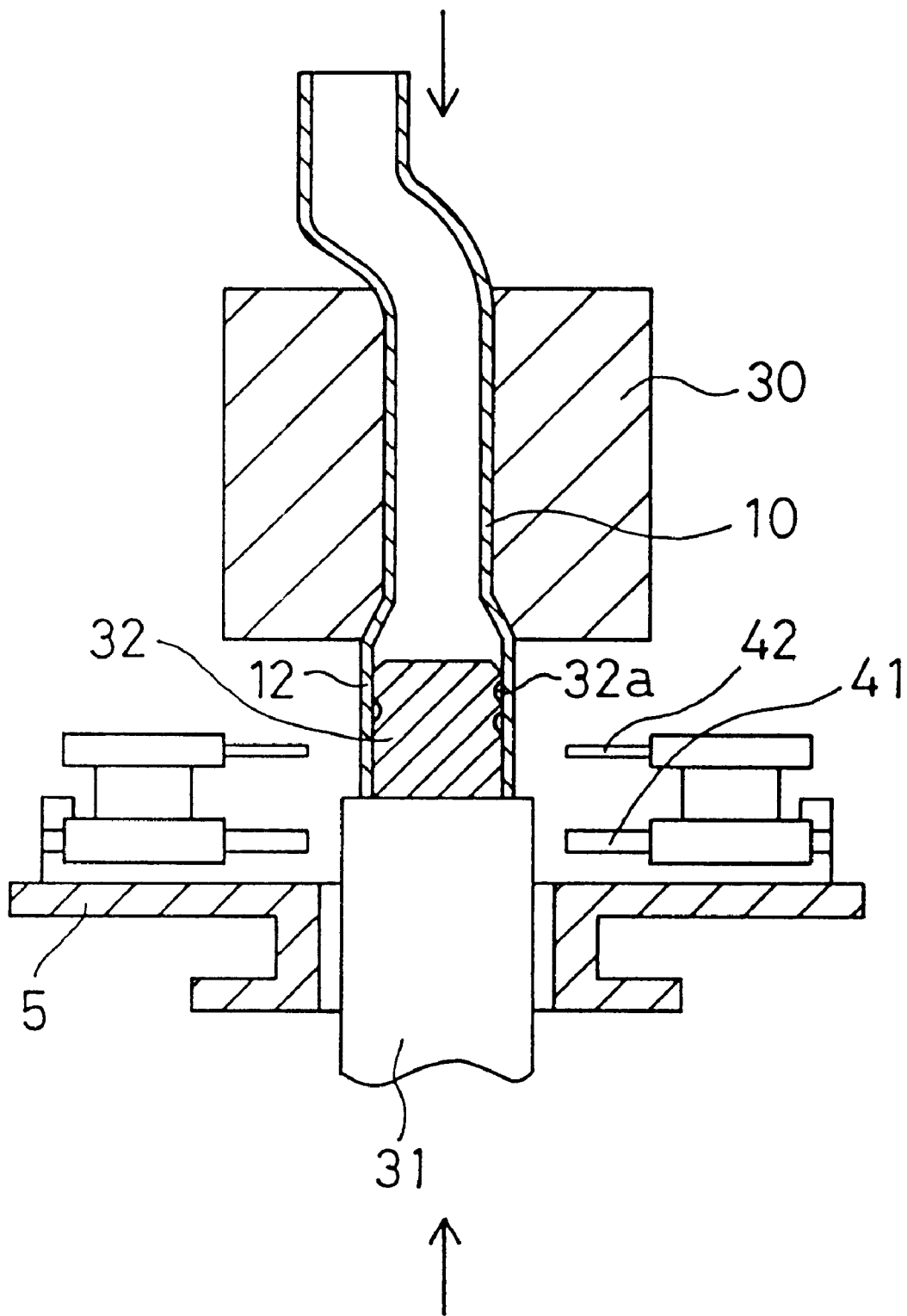
FIG. 5 is an explanatory view showing how to form the spiral groove in another way.

Then, the outer circumference of the pipe 10 is securely held by a hydraulic clamp 30 as shown in FIG. 4. A core bar 32, which is fixed to a pipe end pressurizing die 31, is inserted into the expanded part 12 of the pipe 10. The core bar 32 is provided with an uneven portion 32a to form the spiral groove 2a. Specifically, the uneven portion 32a has approximately the same configuration as the outer circumference of the cap 4, i.e. the screw portion 4a.

In the above state, the roller surface of a roller 20 is pressed on the outer circumference of the expanded portion 12 of the pipe 10 while the roller 20 is rotated around the pipe axis C and at the same time gradually moved downward.

The roller 20 is rotatably held by a roller shaft 22 (approximately parallel to the pipe axis C) provided in a roller support 21. The roller support 21 is attached to a rotary body 5 rotatable around the pipe axis C such that the roller support 21 is movable by means of a hydraulic cylinder 23 in the radial direction of the rotary body 5.

When the roller support 21 is moved radially inward by the hydraulic cylinder 23, the roller 20 is moved in the same direction, with the result that the roller surface of the roller 20 is pressed on the outer circumference of the pipe 10. And when the rotary body 5 is gradually moved downward while rotating around the pipe axis C, the roller 20 is also gradually moved downward while pressing on the outer circumference of the expanded portion 12 of the pipe 10 and rotating around the pipe axis C.

As a result, the expanded portion 12 of the pipe 10 has been transformed to have a configuration corresponding to the uneven portion 32a of the core bar 32 when the roller 20 approaches the open end of the pipe 10 after moving gradually from the end of the core bar 32 downward.

Then the rotation of the rotary body 5 is stopped, the roller support 21 is moved radially outward by the hydraulic cylinder 23, and holding by the hydraulic clamp 30 is cancelled. Thus, the fuel inlet 1 of the present embodiment shown in FIGS. 1 and 2 is obtained.

In the present embodiment, the number of parts can be reduced because it is not necessary to prepare the expanded portion as a separate part. When a fuel inlet having an expanded portion with a different diameter is to be produced, it is only necessary to replace the core bar with another corresponding to the different diameter. Since the same roller can be used, such a fuel inlet can be produced efficiently. Also, an appropriate thickness of the plate can be obtained in the region where the spiral groove 2a is formed.

For producing the above fuel inlet 1, both a roughing roller 41 having a large roller width and a finishing roller 42 having a small roller width may be attached onto the rotary body 5. The roughing roller 41 and the finishing roller 42 are radially movable with respect to the rotary body 5 by the hydraulic cylinder, and the roughing roller 41 and the finishing roller 42 are interchangeable in their position.

The roughing roller 41 is for roughly forming the shape of the expanded portion 12 of the pipe 10, while the finishing roller 42 is for adjusting the shape of the expanded portion 12 of the pipe 10 to the configuration of the core bar 32 in detail. By using both of the roughing roller 41 and the finishing roller 42, the above described operation can be obtained more efficiently, compared with the case where only one roller is used.

Figure 6:
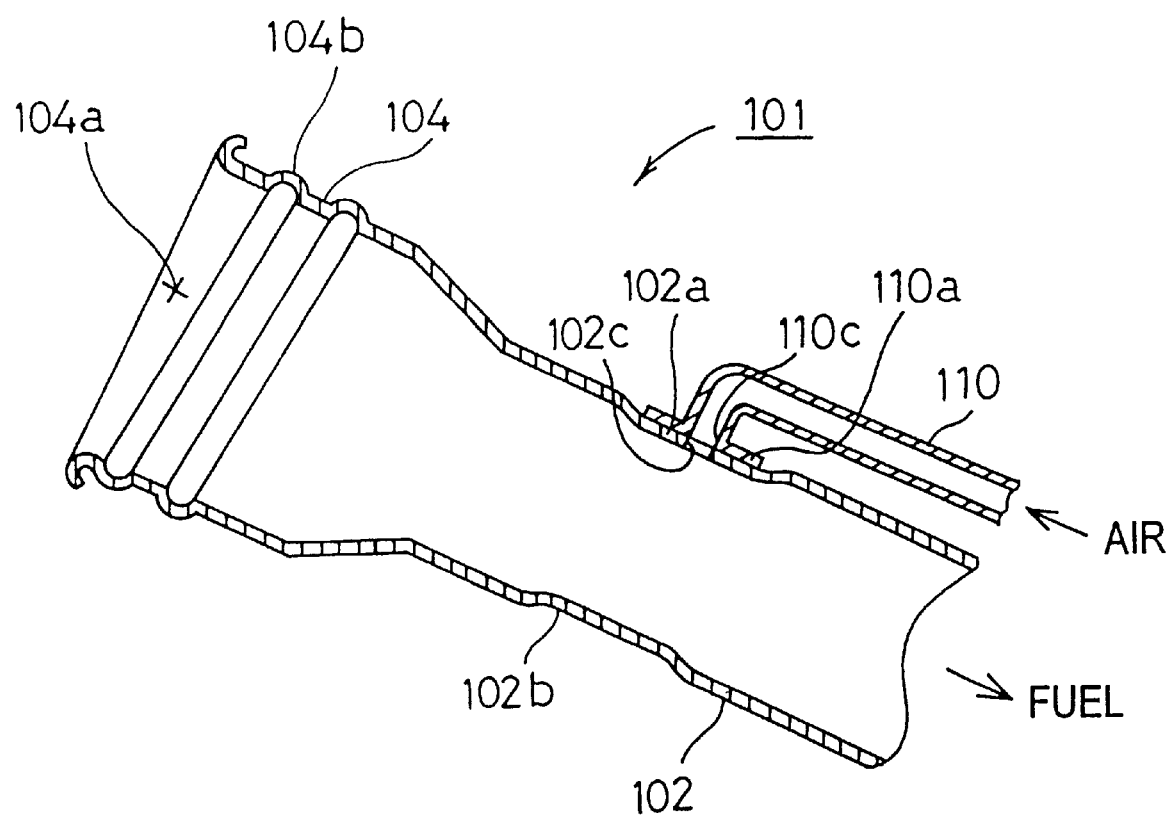
FIG. 6 is a cross-sectional view showing the connecting portion of a breather tube with an inlet pipe in the present invention.

Connection between the breather tube 110 and the inlet pipe 102 will now be described with reference to FIGS. 6–8.

The fuel inlet 101 according to the present embodiment comprises an inlet pipe 102, a feeding portion 104 and a breather tube 110.

The inlet pipe 102 is a cylindrical pipe introducing fuel into the fuel tank (hereinafter referred to as "tank"), and is provided with a flat attachment portion 102a to attach the breather tube 110 thereon and flat support portion 102b to enable easy support of the breather tube 110 during projection welding. Furthermore, the flat attachment portion 102a is provided with a hole 102c communicating with the breather tube 110

Feeding portion 104 is formed by expanding an end of the inlet pipe 102, and is provided with a spiral groove 104b for engaging with a not-shown cap. The breather tube 110 is provided, at the open end 110c thereof, with a flange 110a, which is welded to the flat attachment portion 102a of the inlet pipe 102 by projection welding. The material for the inlet pipe 102 is also used for the breather tube 110 to avoid galvanic corrosion.

With the above fuel inlet 101 attached to a tank of a car, when gasoline is poured through a feeding nozzle inserted into the feeding port 104a of the feeding portion 104, the air in the tank is discharged through the breather tube 110, so that the gasoline supply is performed smoothly and air bubbles are prevented from being mixed with the gasoline in the tank.

Figure 7:
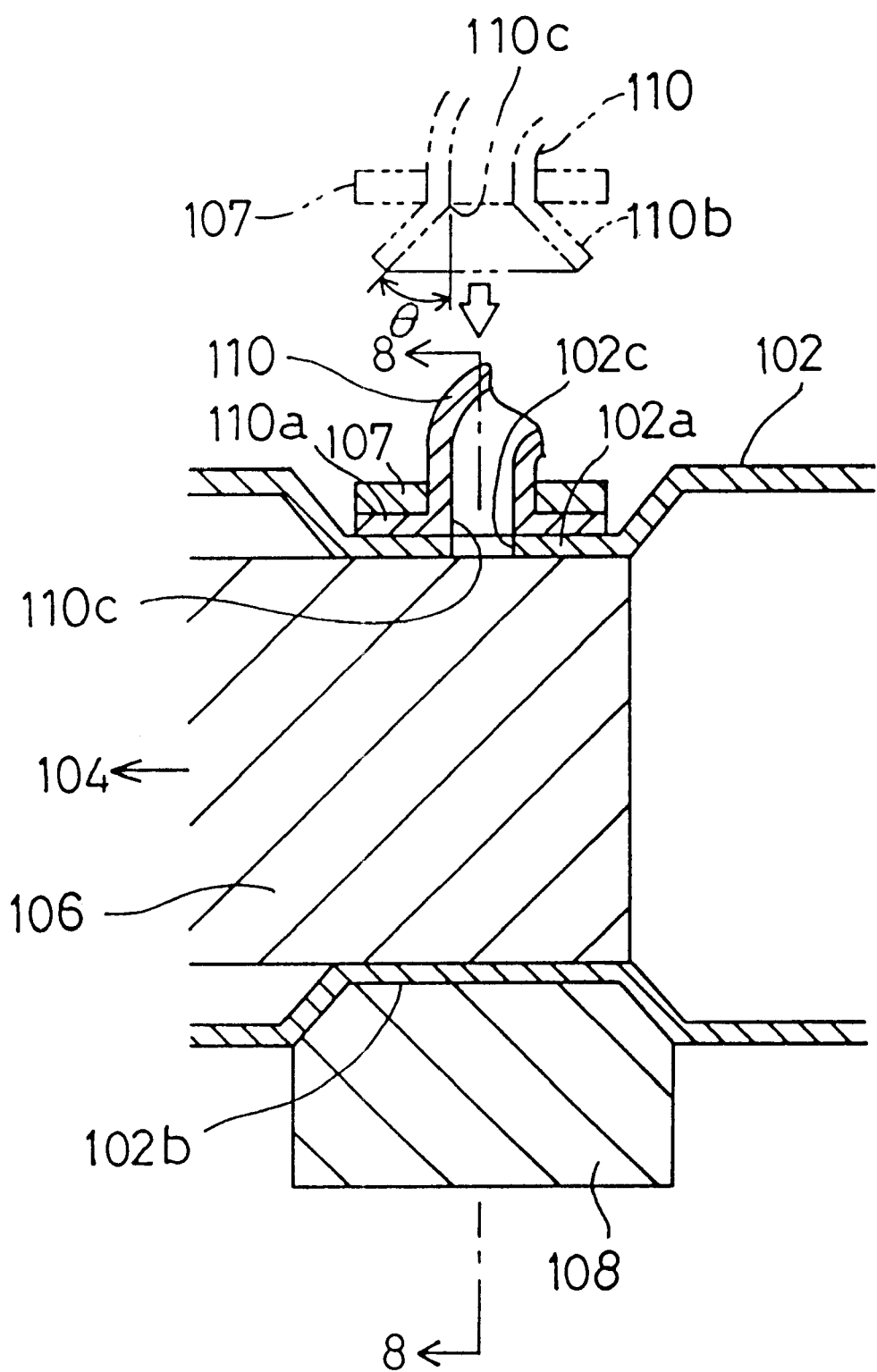
FIG. 7 is a cross-sectional view showing how to form the connecting structure of FIG. 6.
Figure 8:
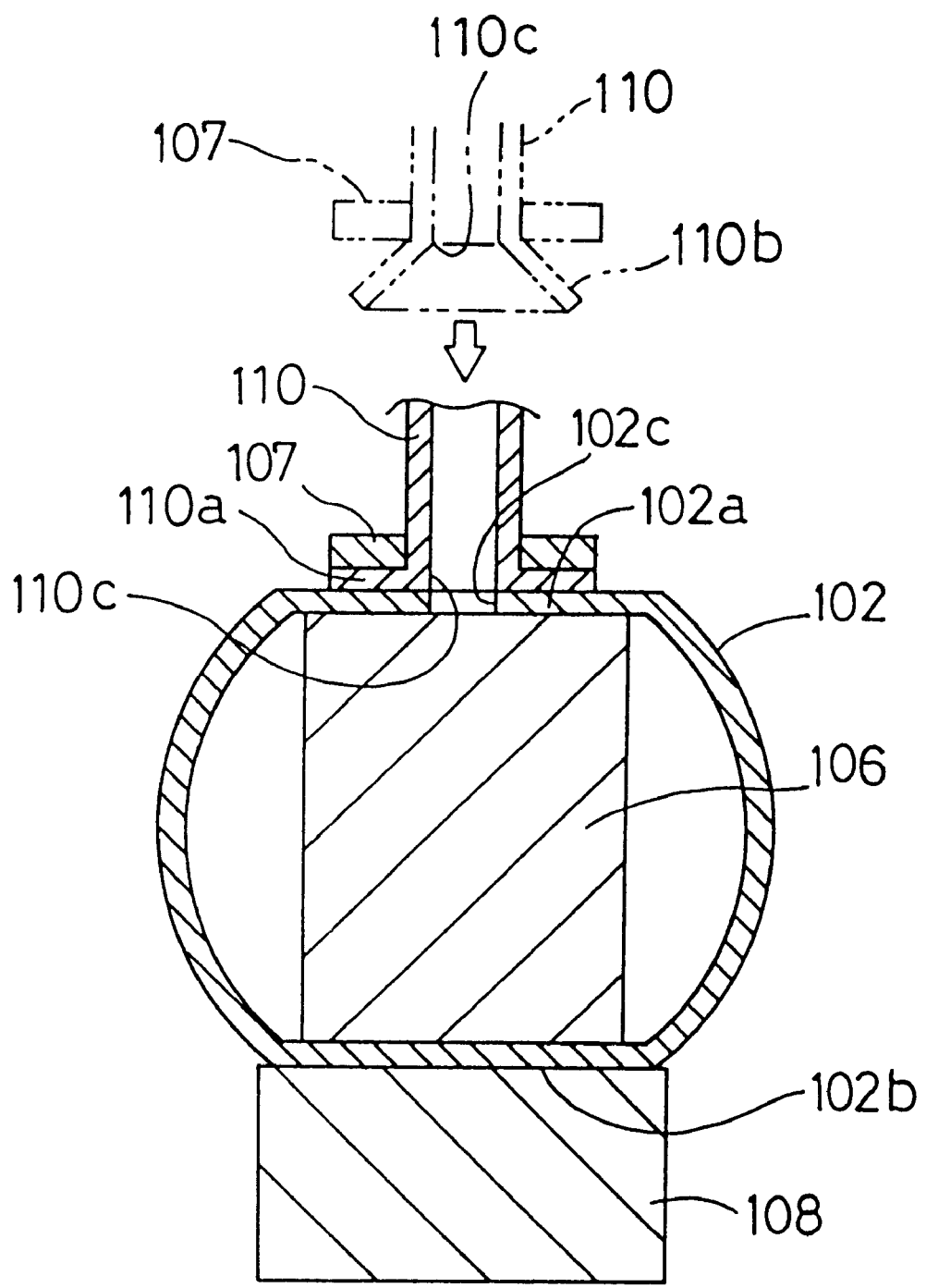
FIG. 8 is a cross-sectional view taken along line 8—8 of FIG. 7.

The connecting method is shown in FIGS. 7 and 8.

The inlet pipe 102 provided with the flat attachment portion 102a, the flat support portion 102b and a hole 102c, the breather tube 110 (indicated by two-dotted chain lines in FIGS. 7 and 8) provided with a flared expanded portion 110b (flare angle $\theta=45°$) at the open end 110c, an approximately rectangular parallelepiped electrode 106, a ring electrode 107, and a support base 108 are prepared. One of the electrodes 106 and 107 is the anode and the other is the cathode.

Firstly, the approximately rectangular parallelepiped electrode 106 is inserted into the inlet pipe 102 from the side of the feeding portion 104. The electrode 106 is disposed so as to contact the whole inner surface of the flat attachment portion 102a. The flat support portion 102b of the inlet pipe 102 is disposed to abut the support base 108 in order to prevent the inlet pipe 102 from turning (around the axis). Then the ring electrode 107 is fitted around the breather tube 110 in the region adjacent to the expanded portion 10b. The inner diameter of the electrode 107 is approximately the same as the outer diameter of the breather tube 110.

Subsequently, the ring electrode 107 is arranged to face the electrode 106 within the inlet pipe 102 and moved downward (indicated by an outlined arrow in FIGS. 7 and 8) until the open end of the expanded portion 110b of the breather tube 110 contacts the flat attachment portion 102a of the inlet pipe 102. Then, while pressing the ring electrode 107 toward the electrode 106, an electric current is passed through both of the electrodes 106 and 107. As a result, while the end of the expanded portion 110b is welded to the flat attachment portion 102a by the resistance heat, the expanded portion is gradually spread by the pressure, and the spread portion is also welded. Thus, the expanded portion 110b finally becomes a flange 110a, the whole circumference of which is welded to the flat attachment portion 102a.

This producing method achieves the following results:

(1) The production costs can be reduced because a high temperature furnace as in a conventional method is no longer necessary.
(2) Forming the flared expanded portion 110b (flare angle θ=45°) at the open end 110c of the breather tube 110 is easier than forming a flange 110a at the open end 110c of the breather tube 110 because the required rate of expansion is lower.
(3) During projection welding, pressure is imposed while the resistance heat is generated, and therefore the flared expanded portion 110b is easily spread to form a flange 110a while being projection welded.
(4) Since a flat surface is provided around the hole 102c, projection welding is easier compared with the case where welding is performed on a curved surface such as a cylindrical surface.
(5) Projection welding brings a smaller oxidized region compared with brazing because a thermally affected region is smaller. Additionally, since the material for the breather tube 110 and the inlet pipe 102 is SUS304, SUS304L or SUS436 according to JIS, oxidization is further suppressed and a high strength of connection can be maintained during a long-term use.

Next, a fuel inlet having a double structure in the vicinity of the fuel port is described.

Figure 9:
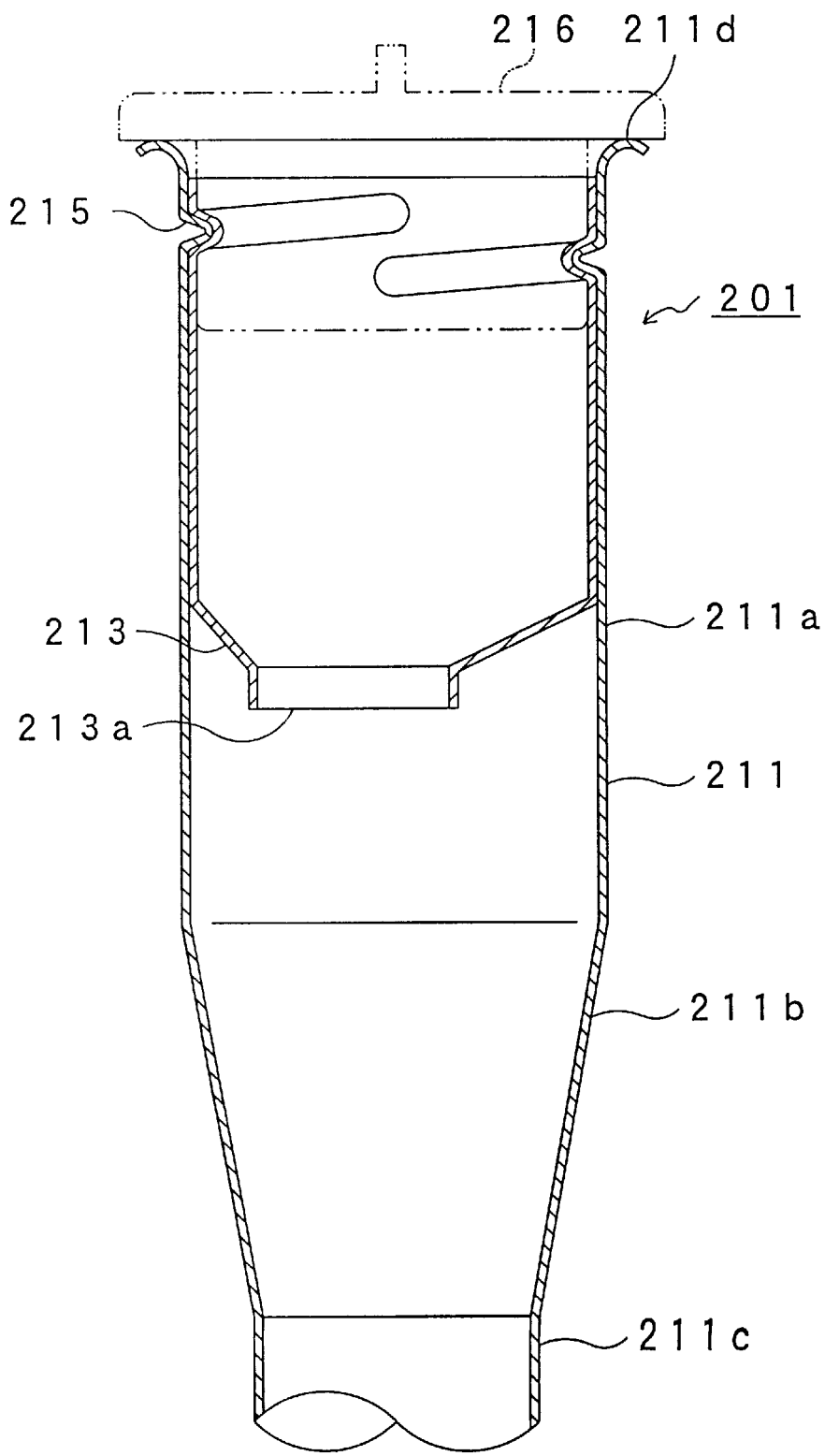
FIG. 9 is a longitudinal cross-sectional view of the fuel inlet of the first embodiment with the expanded portion having a partial double structure.

A fuel inlet 201 shown in FIG. 9 comprises an inlet pipe 211, a retainer 213, a spiral groove 215, and the like.

The inlet pipe 211, which is formed by processing a metal pipe, is provided with an expanded portion 211a, a taper portion 211b and a main body 211c in the order from the fuel port side. The open end 211d of the inlet pipe 211 in the direction of the fuel port is flared and its edge plays the role of sealing the inside of the fuel inlet 201 by keeping close contact with a fuel cap 216. The not-shown rearward end of the inlet pipe 211 is connected to the connecting pipe J shown in FIG. 31, through which it is connected to a fuel tank T. In short, the inlet pipe 211 introduces fuel into the fuel tank T.

The retainer 213, which is formed by processing a metal pipe, has an outer circumference overlapping the inner circumference of the pipe 211. That is, the fuel inlet 201 in the vicinity of the fuel port has a double structure. One open end of the retainer 213 is positioned slightly backward from the flared open end 211d of the inlet pipe 211, and the other open end is narrowed to form an interference portion 213a. The interference portion 213a employed for a car running solely on lead-free gasoline is designed to allow the insertion of a fuel feeding nozzle for lead-free gasoline while rejecting the insertion of a fuel feeding nozzle for leaded gasoline. The retainer 213 also carries out the function of holding the fuel feeding nozzle for lead-free gasoline when it is inserted.

The spiral groove 215, a screw groove to which the fuel port cap 216 can be screwed, is formed when the inlet pipe 211 and the retainer 213 are crimped together. In other words, the inlet pipe 211 and the retainer 213 are crimped to be united when the spiral groove 215 is formed. The inlet pipe 211 and the retainer 213 may be further fixed with each other by welding or soldering in addition to the crimping, although fixing merely by the crimping is usually enough.

Figure 10:
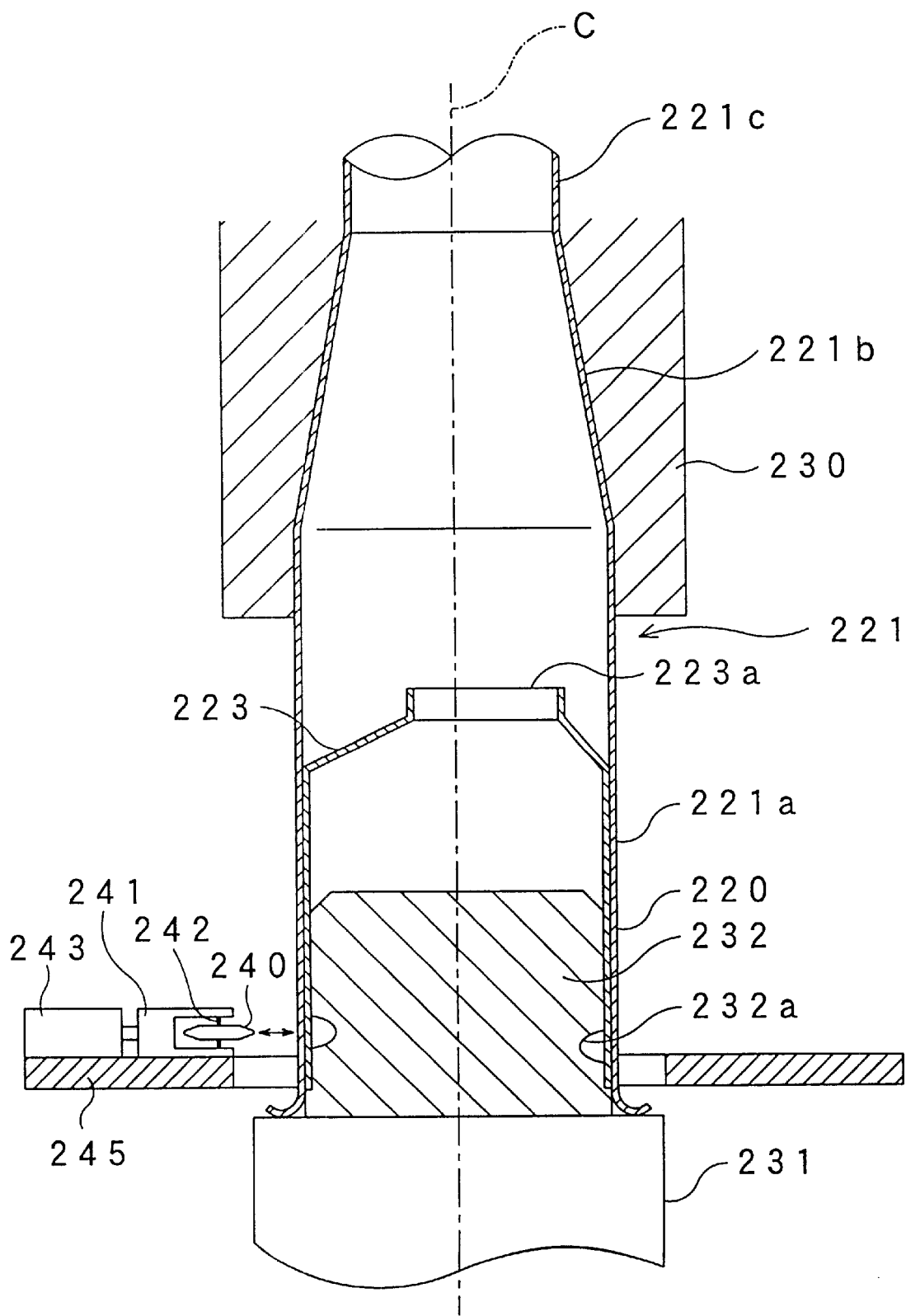
FIG. 10 is an explanatory view showing how to produce the fuel inlet of FIG. 9.

The method of producing the fuel inlet 201 is described with reference to FIG. 10.

Firstly, an inlet pipe 221 (a different number is given to differentiate this from a finished inlet pipe 211) is prepared. The inlet pipe 221 is provided with an expanded portion 221a, a taper portion 221b and a main body 221c formed by increasing the diameter of one end thereof by bulging, and the end of the expanded portion 221a is flared. Also prepared is a retainer 223 (a different number is given to differentiate this from a finished retainer 213). The retainer 223 is made of a metal pipe having an outer circumference fitting the inner circumference of the expanded portion 221a of the inlet pipe 221 when inserted into the expanded portion 221a. One end of the retainer 223 is narrowed to form an interference portion 223a.

After the retainer 223 is inserted into the expanded portion 221a of the inlet pipe 221, a core bar 232 fixed to a pipe end pressure die 231 is inserted into the retainer 223. The core bar 232 is provided with a recess 232a used to form the spiral groove 215. The other end of the retainer 223 is slightly separated from the open end of the inlet pipe 221 due to a step portion of the core bar 232. Then, while the expanded portion 221a, the taper portion 221b and the main body 221c of the inlet pipe 221 are securely held by a hydraulic clamp 230, the pipe end pressure die 231 and the hydraulic clamp 230 are pressured in the approaching directions with each other.

In the above state, a roller 240 is pressed on the outer circumference of the expanded portion 221a of the inlet pipe 221 while the roller 240 is rotated around the pipe axis C and at the same time gradually moved axially.

The roller 240 is rotatably held by a roller shaft 242 provided (approximately parallel to the pipe axis C) in a roller support 241. The roller support 241 is attached to an annular rotary body 245 rotatable around the pipe axis C such that the support 241 is movable by means of a hydraulic cylinder 243 in the radial direction of the rotary body 245 (in the direction indicated by the arrow in FIG. 10).

When the roller support 241 is moved radially inward by the hydraulic cylinder 243, the roller 240 is moved in the same direction, with the result that the roller 240 is pressed on the outer circumference of the inlet pipe 221. And when the rotary body 245 is gradually moved axially while rotating around the pipe axis C such that the roller 240 traces the recess 232a of the core bar 232, the roller 240 is also gradually moved axially rotating around the pipe axis C, while pressing on the overlapping portion of the inlet pipe 221 and the retainer 223.

Then the rotation of the rotary body 245 is stopped, the roller support 241 is moved radially outward by the hydraulic cylinder 243, and the core bar 232 is removed after the holding by the hydraulic clamp 230 is cancelled. Thus, the fuel inlet 201 shown in FIG. 9 is obtained.

According to the fuel inlet 201 described above, since a double structure in the vicinity of its fuel port is given by the retainer 213 and the spiral groove 215 to screw the fuel port cap 216 therein is provided within the double structure portion, durability against repeated opening/closing operations of the fuel port cap 216 as well as resistance to impact caused by an accident is good.

Additionally, since crimping the inlet pipe 211 and the retainer 213 together leads to their unity and simultaneous formation of the spiral groove 215, either welding and the like to unite the inlet pipe 211 and the retainer 213 or conventional complicated folding operation is not required. Thus, production of the present fuel inlet is remarkably easy.

Furthermore, since crimping and simultaneous formation of the spiral groove 215 in the fuel inlet 201 are carried out using the roller 240, a fuel inlet having the expanded portion 211a of a different diameter can be produced by simply replacing the core bar with another core bar corresponding to the diameter and using the same roller 240. Fuel inlets of various sizes thus can be produced easily.

Alternatively, crimping and simultaneous formation of the spiral groove 215 are carried out by a common pressing using, instead of the roller 240, a pair of metal die halves formed to have a configuration approximately corresponding to the core bar 232.

Also, a straight pipe without an interference portion may be used as the reinforcement housing.

Next, a fuel inlet provided with an integrated outer-cylinder-like flange in the expanded portion will be described.

Figure 11:
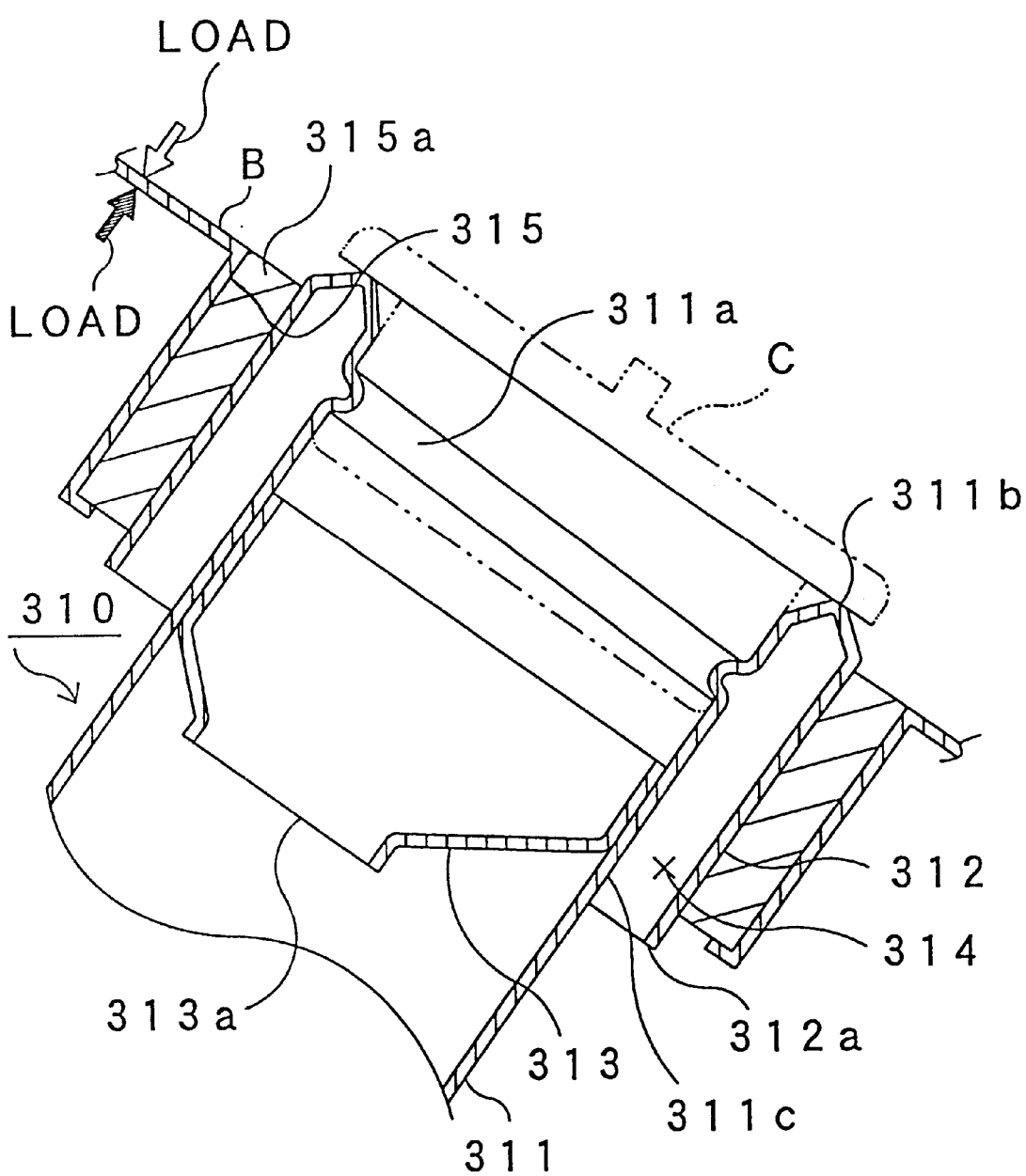
FIG. 11 is a longitudinal cross-sectional view of the fuel inlet of the first embodiment having the expanded portion provided with an integral outer-cylinder-like flange.

As shown in FIG. 11, a fuel inlet 301 comprises an inlet pipe 311 and a retainer 313.

The inlet pipe 311 formed by processing a metal pipe is provided with a spiral groove 311a into which a screw-type fuel port cap C can be screwed in the vicinity of one open end, and an integral outer-cylinder-like flange 312 around the outer circumference in the vicinity of the open end. The flange 312 is formed by expanding, radially outward, the edge 311b on the side of the inlet pipe 311 where the fuel port cap C is screwed then by folding back in the axial direction. The free end 312a of the flange 312 extends beyond the position of the spiral groove 311a, and is separated from the outer circumference 311c of the inlet pipe 311. The flange 312 with an outer-cylinder-like configuration has an outer diameter larger than the outer diameter of the fuel port cap C. The fuel inlet 310 has a space 314 enclosed by the flange 312.

The retainer 313 formed by processing a metal pipe is fixed on the inner surface of the pipe 311 more backward than the spiral groove 311a by brazing or the like. The open end of the retainer 313 on the fuel tank T side is narrowed to form an interference portion 313a.

The process of fixing the fuel inlet 301 is described below. A car body B is provided with a fuel inlet supporting hole 315, which has a synthetic resin seal 315a attached along the inner circumference thereof. The edge 311b of the fuel inlet 301 is forced into the inside of the seal 315a of the fuel inlet supporting hole 315 until the edge 311b reaches a predetermined position. As a result, the fuel inlet 301 is fixed to the car body B with the flange 312 pressed by the fuel inlet supporting hole 315.

In this fixing structure, relative movement between the fuel inlet 301 and the car body B is possible. Therefore, even if a load in the direction indicated by the outlined arrow in FIG. 11 is imposed on the car body B in an accident, for example, the car body B becomes dented independently of the fuel inlet 301, which is therefore not directly affected by the load. If a load in the direction indicated by the black arrow in FIG. 11 is imposed on the car body B in an accident, the car body B bulges independently of the fuel inlet 301, which also is not directly affected by the load. In this case, there is no fear that the fuel port cap C comes off because of the bulging of the car body B since the outer diameter of the fuel port cap C is smaller than the outer diameter of the flange 312.

In the above described fuel inlet 301, the flange 312 formed by extending the inlet pipe 311 does not increase the number of parts or require additional process to assemble the same into the fuel inlet 301. Therefore, the costs are reduced compared with the case where a conventional cylindrical cover is employed. Also, when the fuel inlet 301 is forced and fixed into the fuel inlet supporting hole 315, the flange 312 is not displaced axially relative to the fuel inlet 301, and therefore a conventional retaining mechanism is not required to be provided, that is, a simpler structure can be achieved. In short, the present embodiment has advantages of the simpler structure as well as the reduced cost for fixing the fuel inlet to the car body B with relative movement therebetween allowed.

In connection with the edge 311b of the inlet pipe 311, surface precision with a predetermined tolerance is required to fulfill the function of sealing the inside of the fuel inlet 311 by contacting the fuel port cap C. Further advantage of the present embodiment is that this requirement can easily be satisfied since the flange 312 is formed to extend relatively long toward the tank T.

Figure 12:
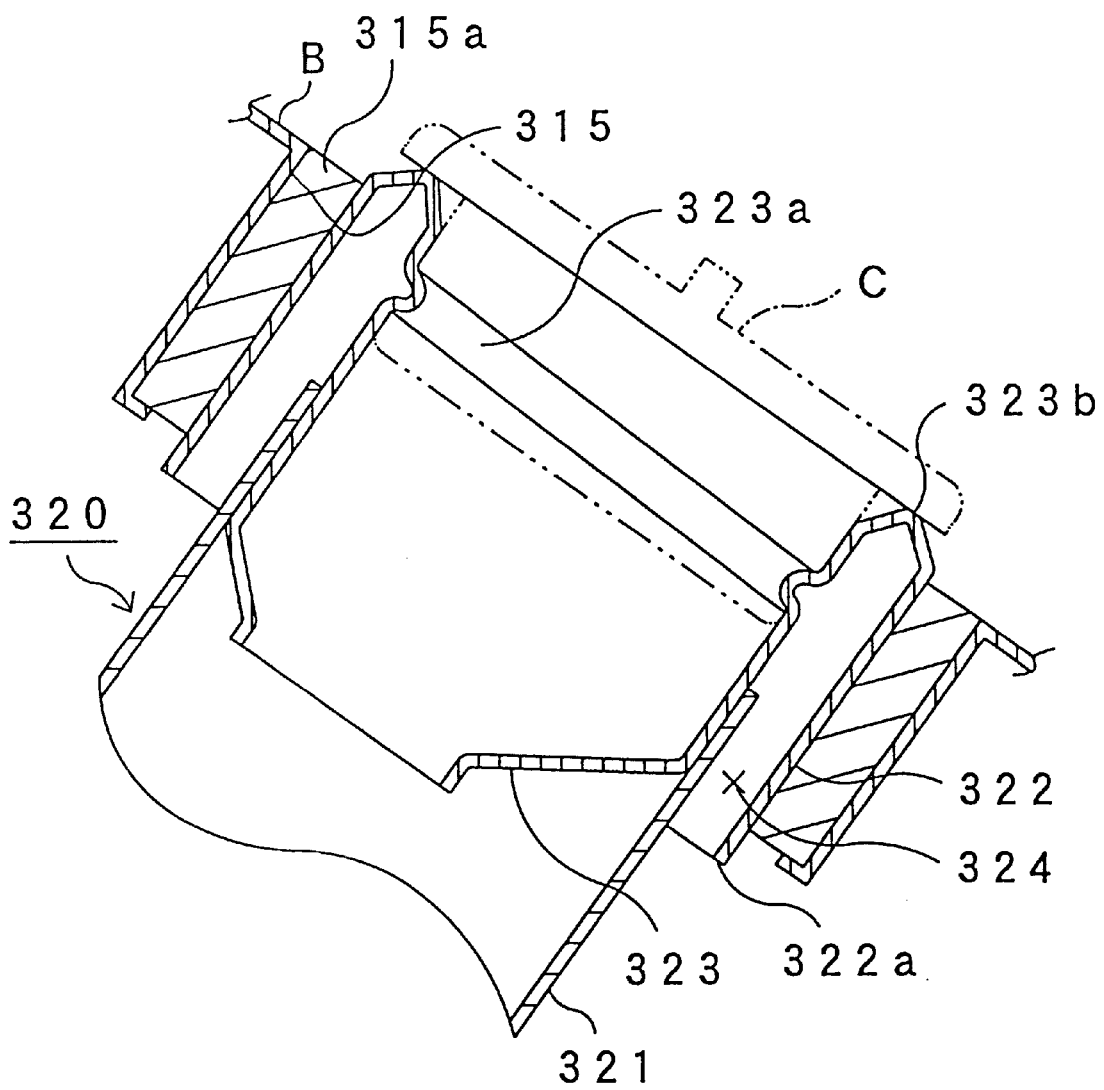
FIG. 12 is a longitudinal cross-sectional view of the fuel inlet having the expanded portion provided with another integral outer-cylinder-like flange.

FIG. 12 is a longitudinal cross-sectional view of a modified fuel inlet. In this modification, a retainer 323 is fixed to the inner circumference of an inlet pipe 321 by brazing or the like, being partially exposed to the outside from the opening of the inlet pipe 321.

The retainer 323 is provided with a spiral groove 323a into which a screw-type fuel port cap C can be screwed in the vicinity of one open end, and an integral outer-cylinder-like flange 322 around the outer circumference in the vicinity of the open end. The flange 322 is formed by expanding, radially outward, the edge 323b on the side of the retainer 323 where the fuel port cap C is screwed and by folding back the same in the axial direction. The free end 322a of the flange 322 is separated from the outer circumference thereof. The flange 322 having approximately an outer cylinder configuration has an outer diameter larger than the outer diameter of the fuel port cap C. The fuel inlet 320 has a space 324 enclosed by the flange 322.

Figure 13:
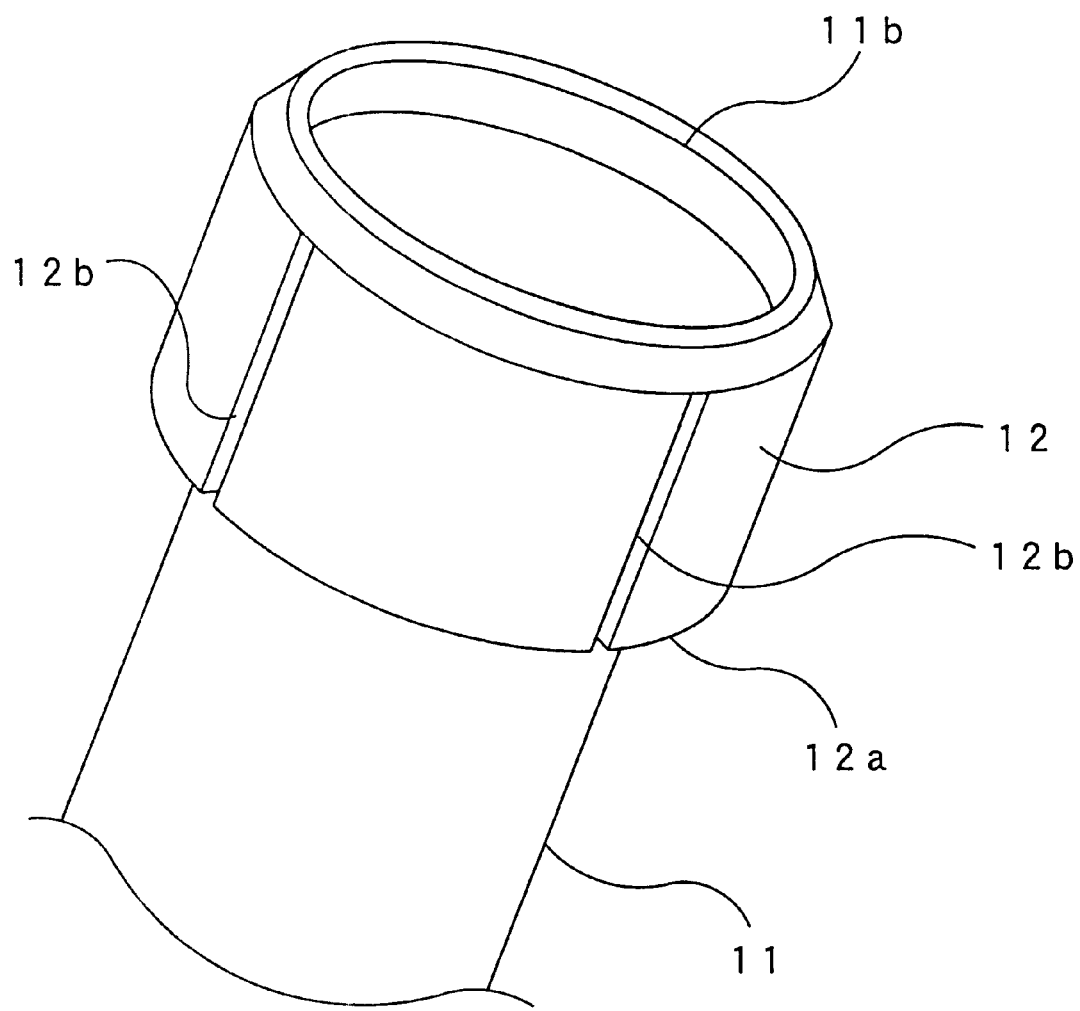
FIG. 13 is a perspective view of another outer-cylinder-like flange.

As shown in FIG. 13., the flange 312 may be elastically deformable in the radial direction by providing slits 312b in the axial direction in the flange 312. In this case, the flange 312 is pressed radially inward when pressured into the fuel inlet supporting hole 315, which causes springback, i.e. elasticity radially outward. Therefore, the fuel inlet 301 is further securely supported by the fuel inlet supporting hole 315. Such structure can be employed in the above modification.

Figure 14:
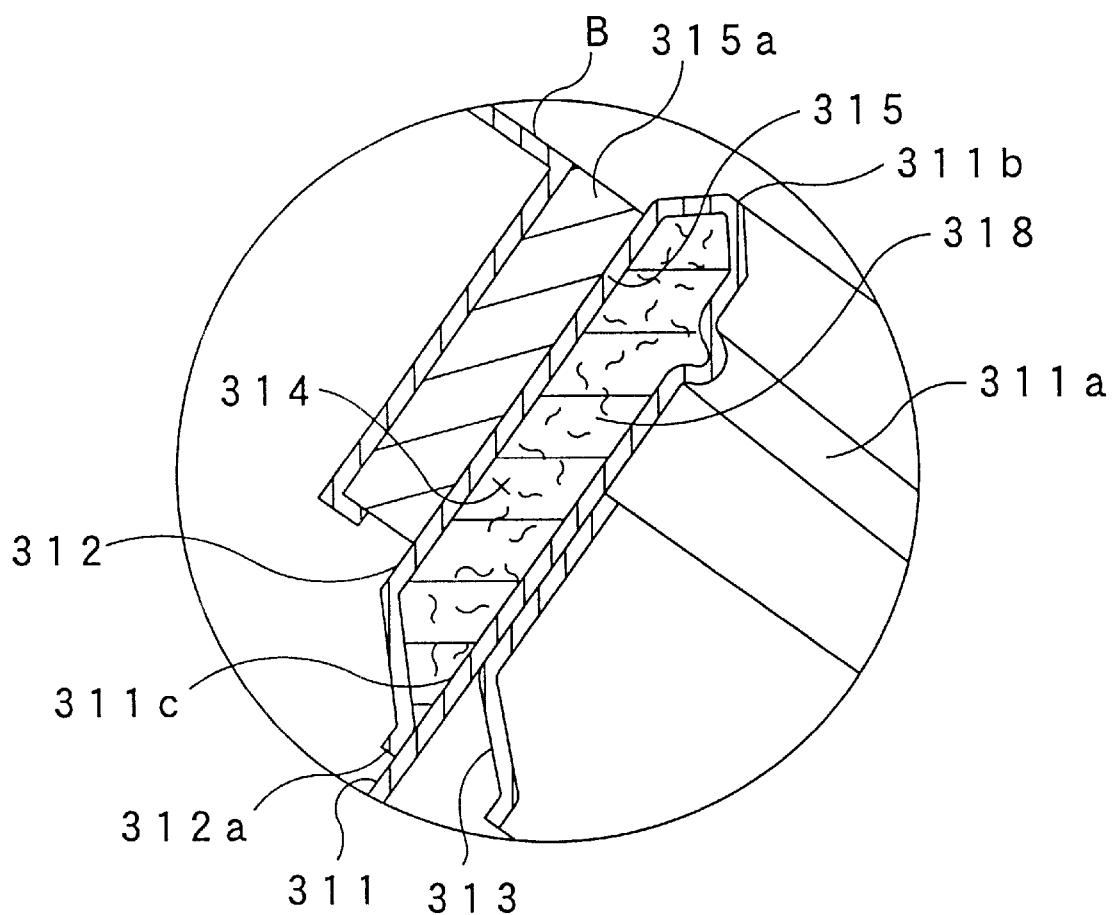
FIG. 14 is a longitudinal cross-sectional view of a further outer-cylinder-like flange.

In the fuel inlet 301, the space 314 enclosed by the outer-cylinder-like flange 312 may be filled with an oscillation absorbing material 318 such as glass wool as shown in FIG. 14 in order to improve stiffness and safety during assembly operation. In this case, since oscillation of the car body B is absorbed by the oscillation absorbing material 318, the oscillation of the car body B does not directly affect the fuel inlet 301. This structure, of course, may be employed in the above described modification. In this case, as shown in FIG. 14, part or the whole of the free end 312a preferably is folded back radially inward to hold the oscillation absorbing material 318.

Figure 15:
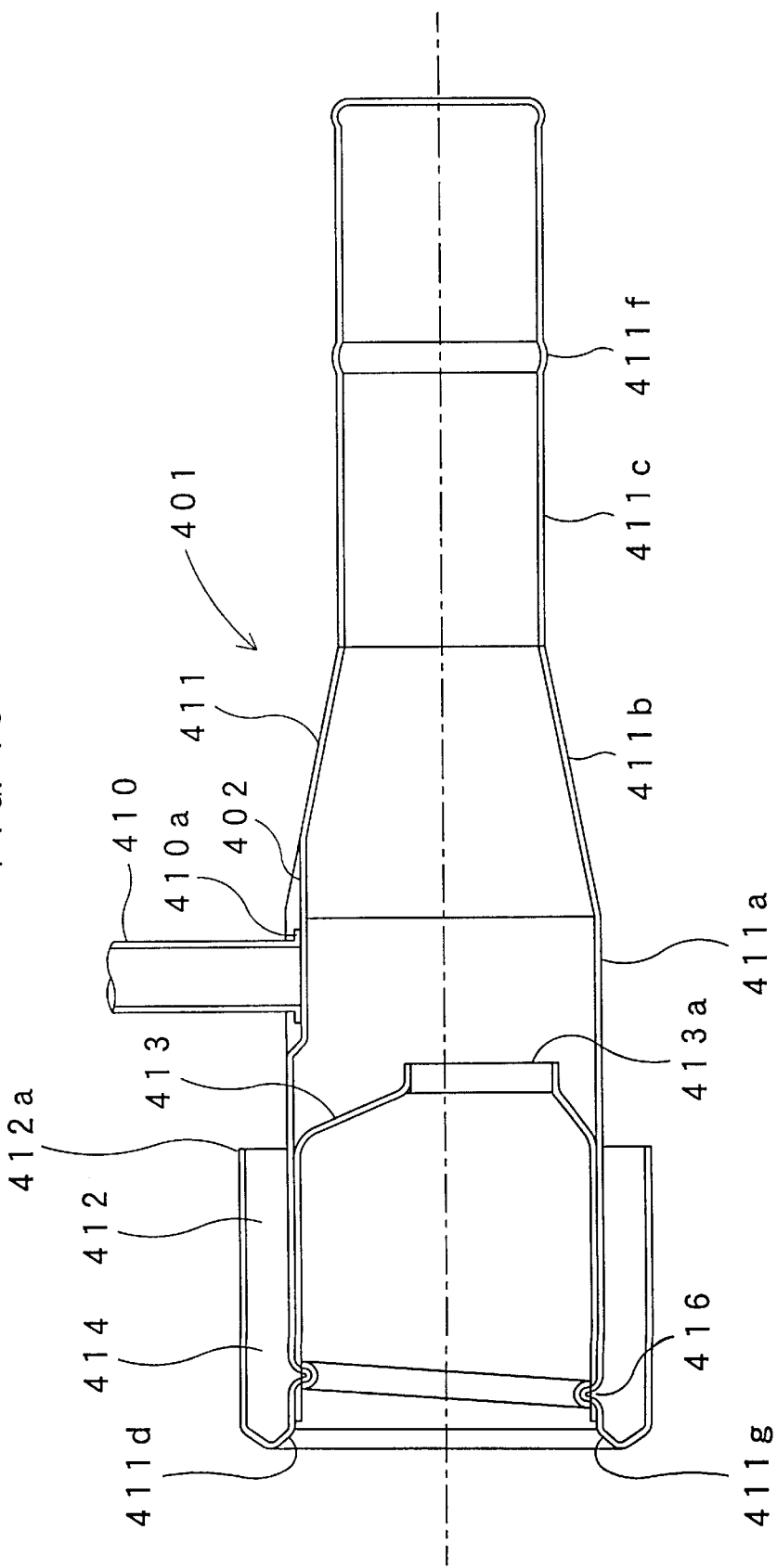
FIG. 15 is a cross-sectional view of the fuel inlet having a characteristic structure of the first embodiment.

FIG. 15 is a cross-sectional view showing a fuel inlet in which the above described various features are incorporated.

A fuel inlet 401 comprises an inlet pipe 411, a breather tube 410, a retainer 413 and a spiral groove 416.

As shown in FIG. 15, the inlet pipe 411, which is formed by processing a metal pipe, is provided with an expanded portion 411a, a taper portion 411b and a main body 411c in the order from the fuel port side. Part of the main body 411c is provided with an annular projection 411f for reinforcement.

The expanded portion 411a of the inlet pipe 411 is formed by increasing the diameter by bulging. To avoid causing defects such as cracks in the pipe during bulging, SUS304, SUS304L or SUS436 according to Japanese Industrial Standards or JIS is used as the material of the pipe. The diameter of the main body 411c is 25.4 mm, and the diameter of the expanded portion 411a is 50 mm.

The open end 411d on the fuel port side of the inlet pipe 411 is flared, and its edge 411g carries out the function of sealing the inside of the fuel inlet 401 by contacting a not shown fuel port cap.

In the vicinity of the open end 411d of the expanded portion 411a is provided a spiral groove 416, into which a screw-type fuel port cap can be screwed. Also a flange 412 having an outer-cylinder-like configuration is provided, integrally with the inlet pipe 411, outside the expanded portion 411a in the vicinity of the open end 411d.

The outer-cylinder-like flange 412 is formed by expanding, radially outward, the edge 411g on the side of the inlet pipe 411 where the fuel port cap is screwed and by folding back the same in the axial direction. The free end 412a of the flange 412 extends beyond the position of the spiral groove 416, and is separated from the outer circumference of the inlet pipe 411. The outer-cylinder-like flange 412 has an outer diameter larger than the outer diameter of the fuel port cap. The fuel inlet 401 has a space 414 enclosed by the flange 412.

Figure 31:
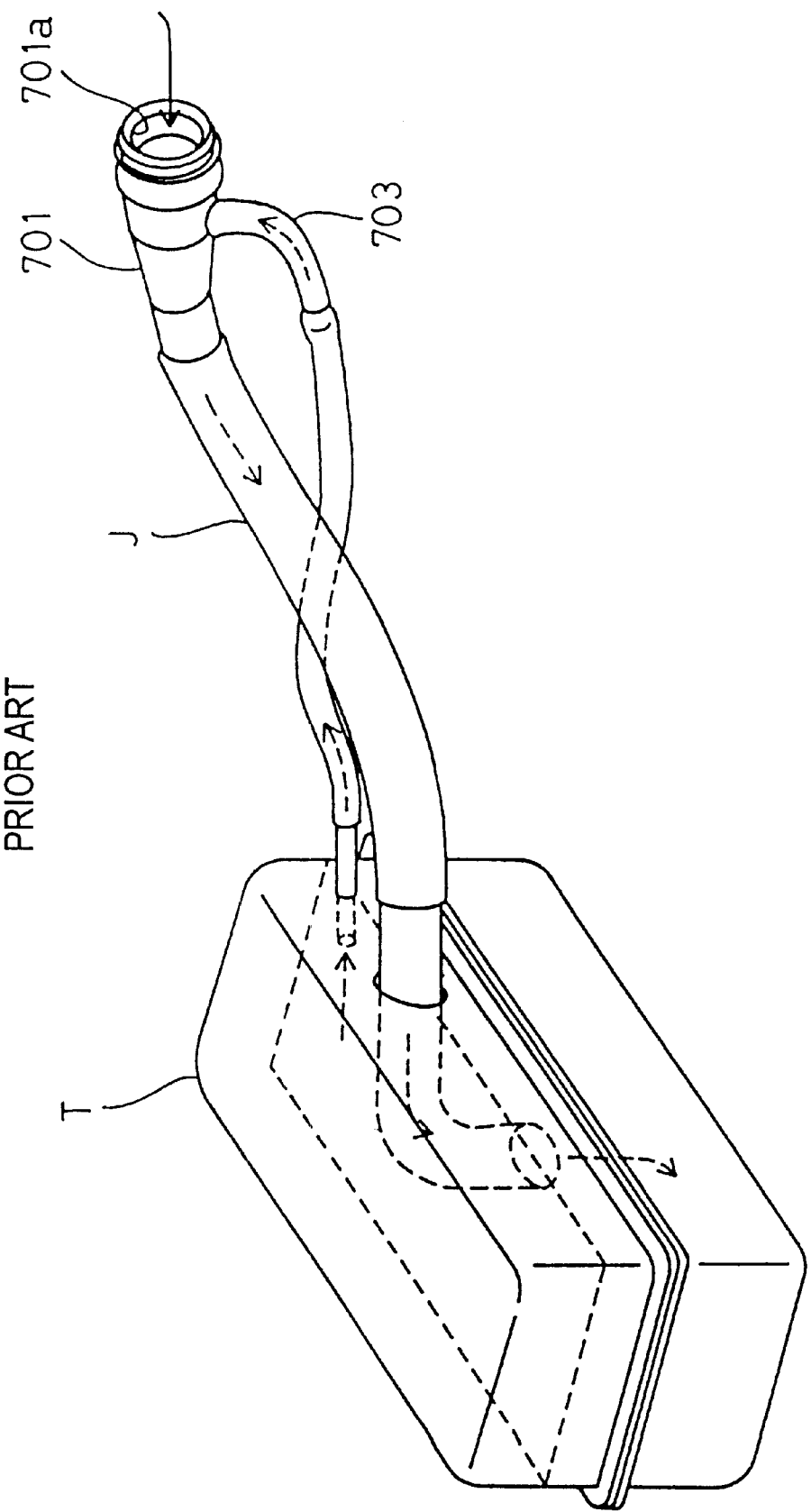
FIGS. 31, 32, 33A, 33B and 34 are explanatory views showing fuel inlets related to prior art of the present invention.
Figure 32:
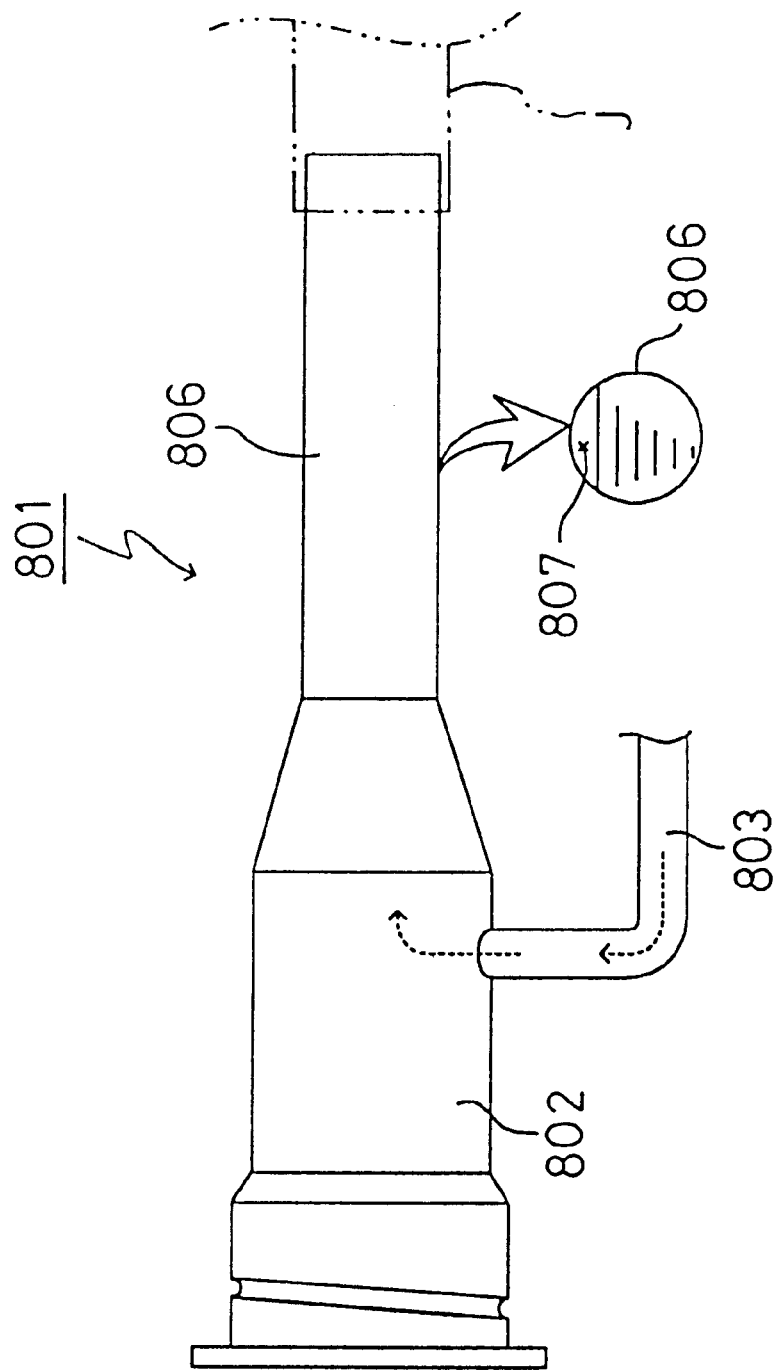
Figure 33B:
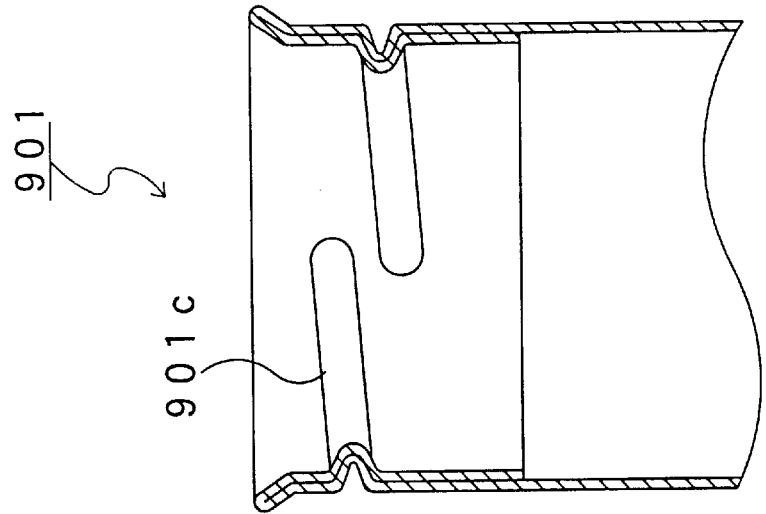
Figure 33A:
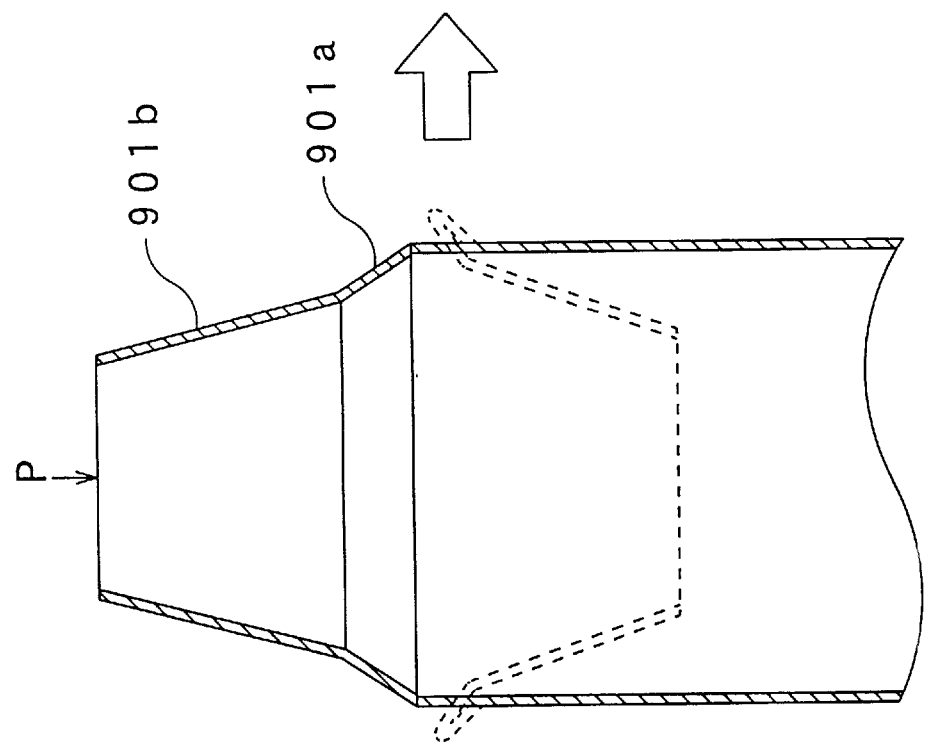
Figure 34:
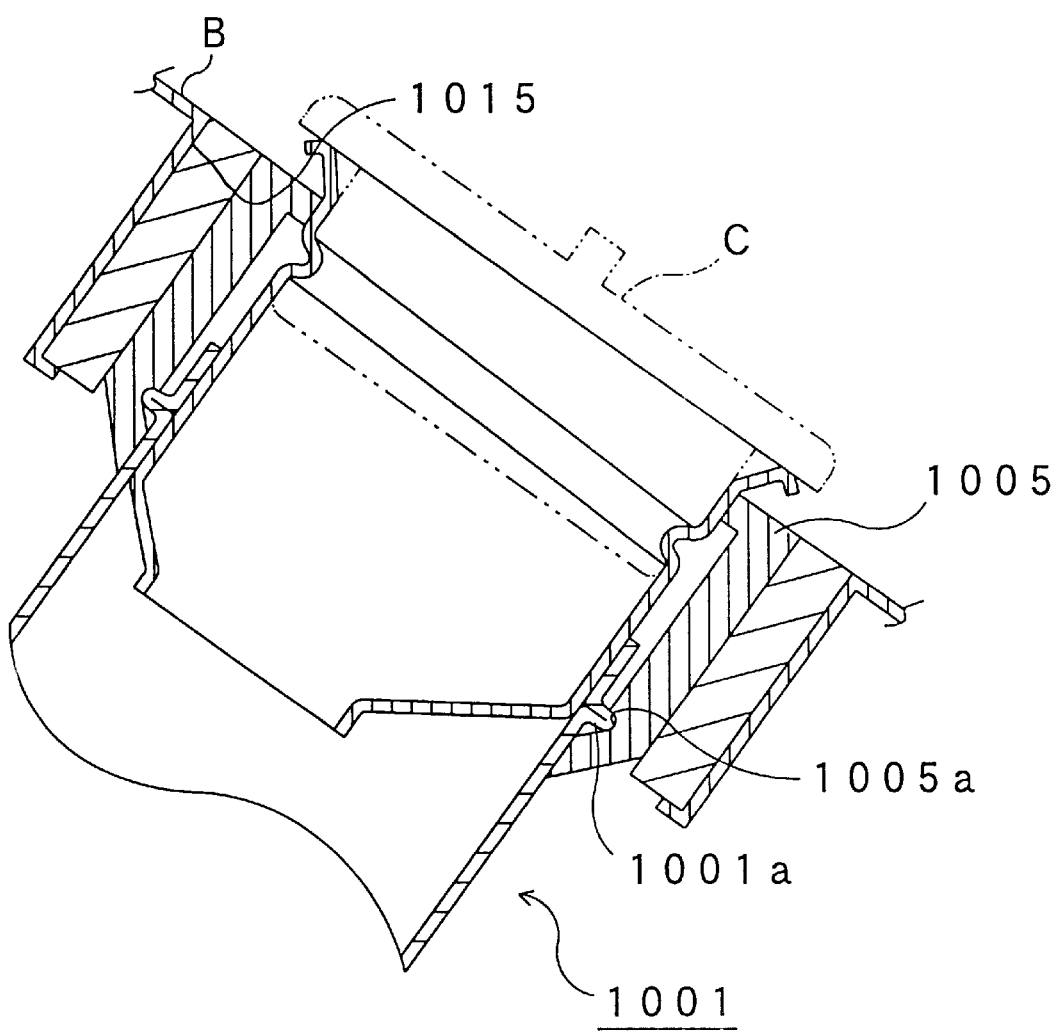

The not-shown rearward end of the inlet pipe 411 is connected to, for example, the connecting pipe J shown in FIG. 31, through which it is connected to the fuel tank T.

The retainer 413 formed by processing a metal pipe has an outer circumference overlapping the inner circumference of the inlet pipe 411. That is, the fuel inlet 401 has a double structure in the vicinity of the fuel port. The above mentioned spiral groove 416 is formed when the inlet pipe 411 and the retainer 413 are crimped together.

One open end of the retainer 413 is positioned slightly backward from the flared open end 411d of the inlet pipe 411, and the other open end is narrowed to form an interference portion 413a.

The inlet pipe 411 is provided with a flat attachment portion 402 for attaching a breather tube 410 thereon. The breather tube 410 is fixed on the flat attachment portion 402 by the method described above with reference to FIGS. 6 to 8.

The inlet pipe 411 and the retainer 413 have the same thickness of 0.8 mm.

Second Embodiment

In this embodiment, a fuel inlet is produced by expanding part of a pipe and narrowing other part of the same.

Figure 16:
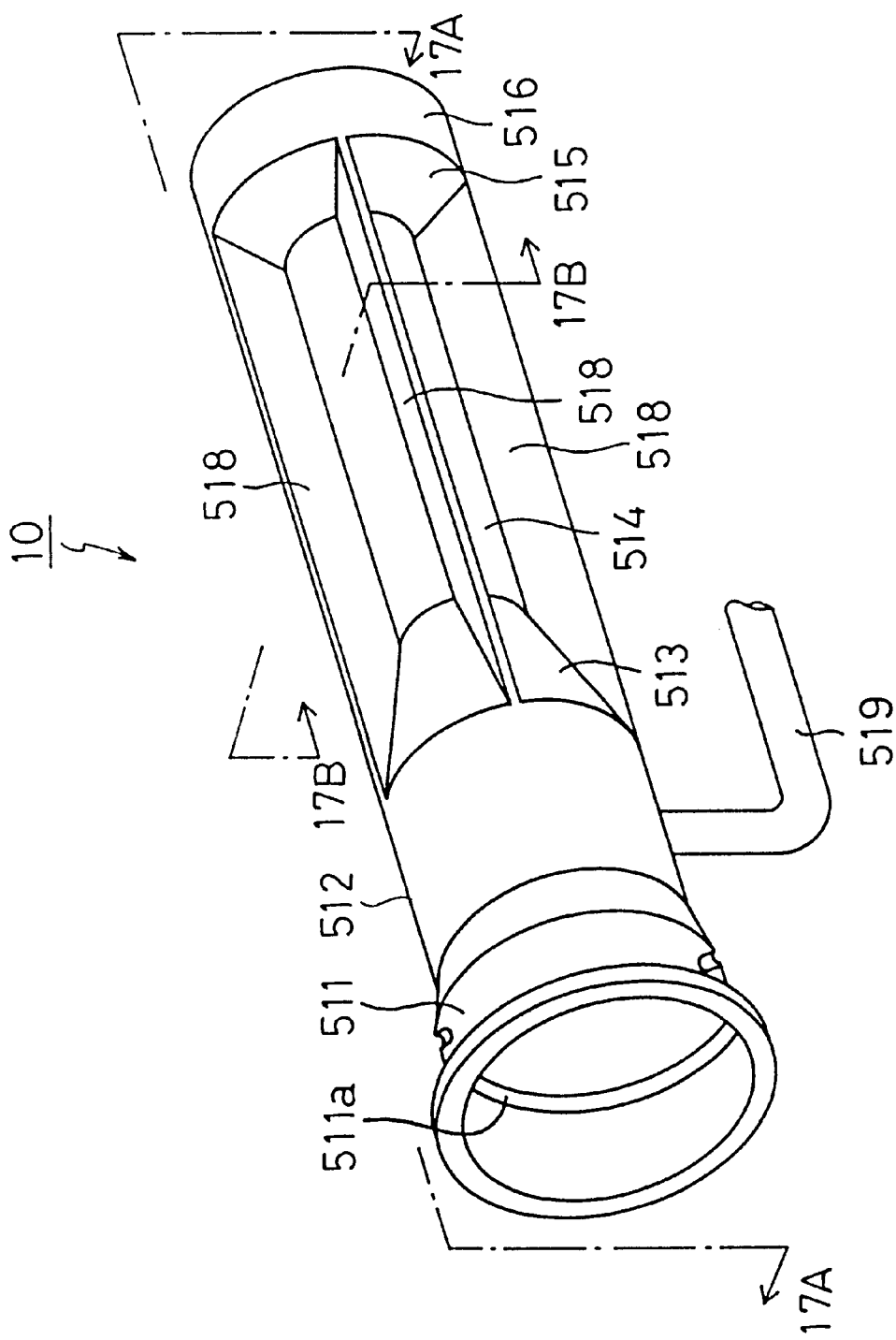
FIG. 16 is a perspective view of a fuel inlet according to a second embodiment of the present invention with a relatively small diameter portion formed by narrowing a pipe.

Referring to FIG. 16, a fuel inlet 501 comprises a cap attachment portion 511, a relatively large diameter portion 512 (φ42.7 mm), a first taper portion 513, a relatively small diameter portion 514 (φ25.4 mm), a second taper portion 515 and a connecting portion 516. The fuel inlet 501 is made by pressing a pipe (hereinafter referred to as "a blank pipe") having the same diameter as the relatively large diameter portion 512.

The cap attachment portion 511 is formed by expanding part of the blank pipe to have (φ50 mm) by bulging and is provided with a spiral groove 511a for fixing a screw cap. The spiral groove 511a is formed directly within the cap attachment portion 511 by the method described above in the first embodiment.

One end of a breather tube 519 is connected to the relatively large diameter portion 512, in which the blank pipe unprocessed is used. The other end of the breather tube 519 is connected to a fuel tank T. An interference portion 517 may be attached, when required, to the relatively large diameter portion 512. The interference portion 517 is a member to prevent leaded gasoline from mistakenly being fed when fuel is to be fed to a car only for lead-free gasoline. Specifically, the member allows insertion of a fuel feeding nozzle for lead-free gasoline, but prevents insertion of a fuel feeding nozzle for leaded gasoline.

The relatively small diameter portion 514, which is arranged at a given position on the fuel tank side of the blank pipe, has a smaller diameter compared with the blank pipe because four elongate protrusions 518 each having a configuration that two outwardly pinched faces are joined are provided at approximately equal angles one another, as shown in FIG. 17B. The elongate protrusions 518 are arranged in the axial direction.

The first taper portion 513 is formed between the relatively large diameter portion 512 and the relatively small diameter portion 514 such that the height of the elongate protrusions 518 gradually increases from the relatively large diameter portion 512 toward the relatively small diameter portion 514 and thus oppositely the inner diameter of the first taper portion 513 gradually decreases.

The second taper portion 515 is formed between the relatively small diameter portion 514 and the connecting portion 516 such that the height of the elongate protrusions 518 gradually decreases from the relatively small diameter portion 514 toward the connecting portion 516, and thus oppositely the inner diameter of the second taper portion 515 gradually increases.

To the connecting portion 516 made of the blank pipe unprocessed is connected an end of a connecting pipe J (for example a flexible tube and the like) which is connected to the fuel tank T. A not-shown circumferential protrusion may be provided on the connecting portion 516. The circumferential protrusion carries out the function of preventing the connecting tube J such as a flexible tube fitted thereon from coming off.

Next, an example of how to use the fuel inlet 501 of the present embodiment is described. A not-shown screw cap is screwed on the cap attachment portion 511 of the fuel inlet 501. When fuel supply is necessary, the cap is removed, a not-shown fuel feeding nozzle is inserted through the cap attachment portion 511, and fuel is supplied at a predetermined flow rate. The supplied fuel passes through the inside of the fuel inlet 501, then is transported to the fuel tank T through the connecting pipe J. On the other hand, the air in the fuel tank T goes through the breather tube 519 toward the entrance of the fuel inlet 501.

Since the fuel inlet 501 has the first taper portion 513, the relatively small diameter portion 514 and the second taper portion 515, the space in the cross-section of the passage when the fuel supplied at a predetermined flow rate passes therethrough becomes smaller than usual. Accordingly, negative pressure in the space becomes higher due to venturi negative pressure, with the result that the air coming from the fuel tank T toward the entrance through the breather tube 519 is prevented from being released into the atmosphere. That is, liquid seal is obtained.

Figure 18:
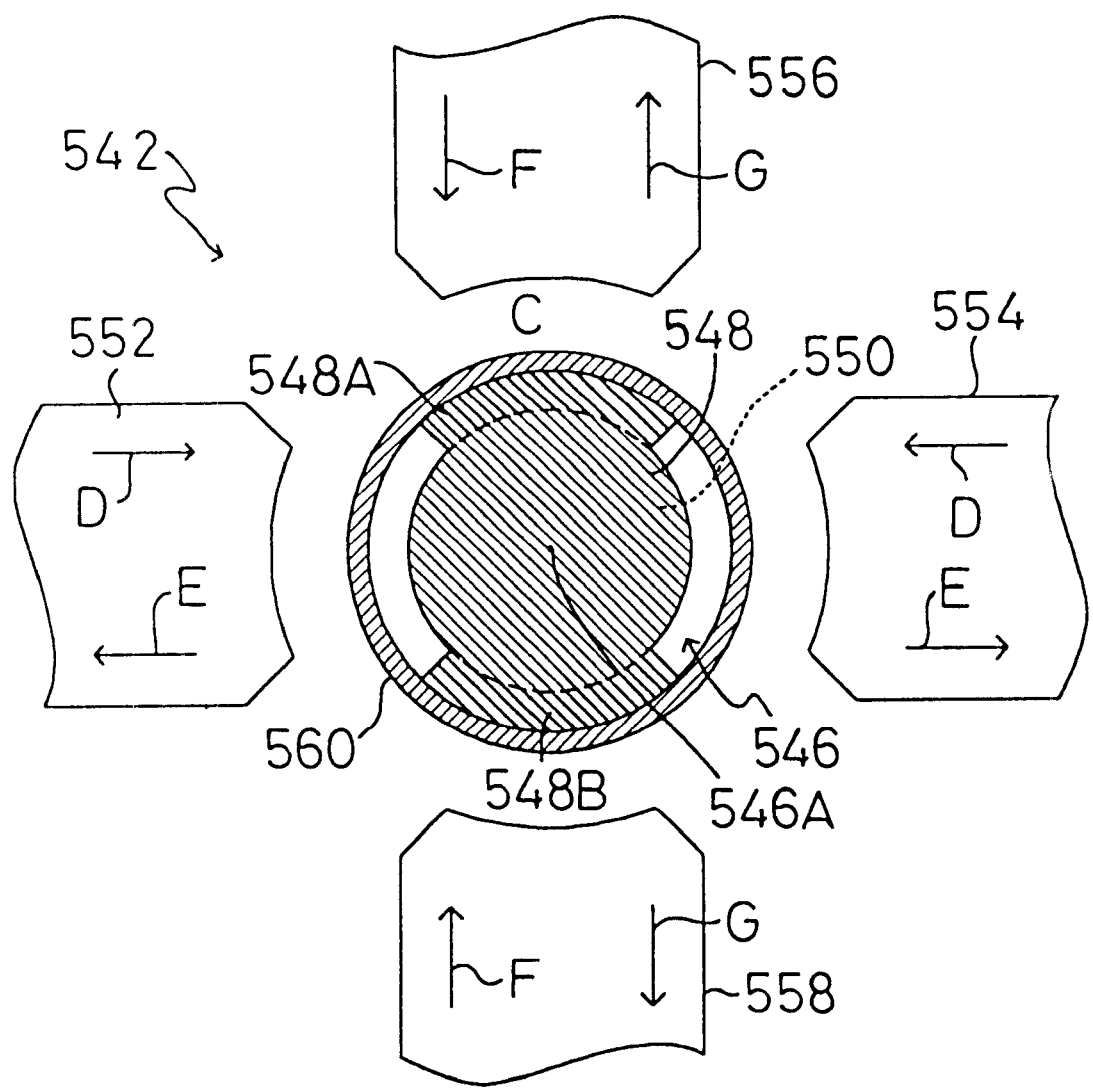
FIG. 18 is a schematic explanatory view showing a press used for producing the fuel inlet of FIG. 16.

The method of producing the fuel inlet 501 will now be described. FIG. 18 is a schematic explanatory view of a press, and FIG. 19 is an explanatory view of a core of the press.

A press 542 is provided with a core 546, and is also provided with dies 552 and 554 in the right and left directions, respectively, relative to the axis 546A of the core 546. These dies 552 and 554 are movable by not-shown driving means in the pressing directions (the directions indicated by arrows D in FIG. 18) and the retreating directions (the directions indicated by arrows E in FIG. 18).

The press 542 is provided with stoppers 556 and 558 in the upward and downward directions, respectively, relative to the axis 546A of the core 546. These stoppers 556 and 558 are movable in the holding directions (the directions indicated by arrows F in FIG. 18) and the retreating directions (the directions indicated by arrows G in FIG. 18) to hold a blank pipe 560.

Figure 19:
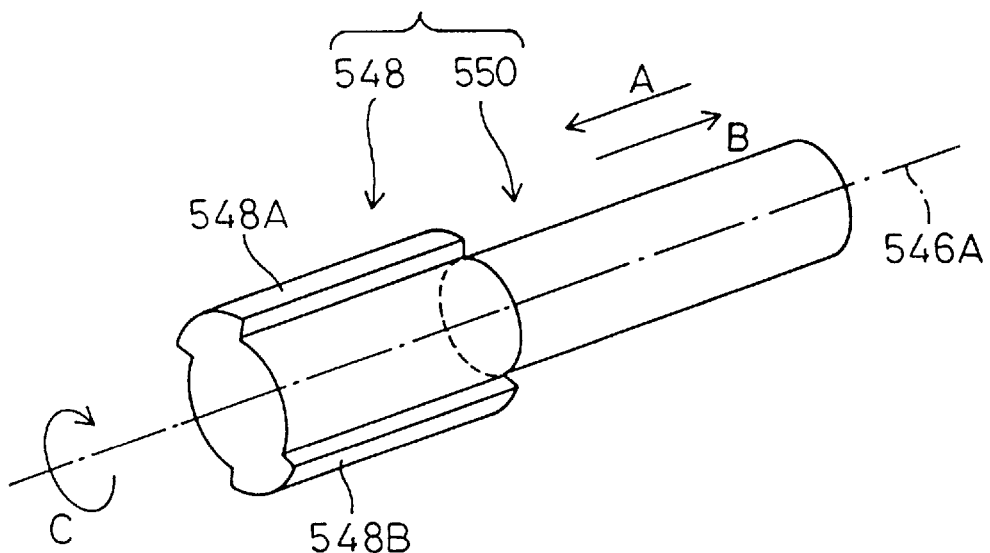
FIG. 19 is a perspective view of a core material used for producing the fuel inlet of FIG. 16.

As shown in FIG. 19, the core 546 can be advanced and retreated by not-shown driving means along the axis 546A (the direction indicated by arrows A and B in FIG. 19). The core 546 consists of a first core portion 548 and a second core portion 550 along the axis. The second core portion 550 is cylindrical, and the first core portion 548 is provided with a pair of cross-sectionally fan-shaped protrusions 548A and 548B at the diametrical positions on the outer circumference of the cylinder having the same diameter as the second core portion 550.

Accordingly, the first core portion 548 and the second core portion 550 can be moved to the press position for the dies 552 and 554 by moving the core 546 in the direction of arrow A or B in FIG. 19. The core 546 is rotatable around the axis 546A through a predetermined angle in both clockwise (in the direction indicated by an arrow C) and counterclockwise directions.

Figure 20:
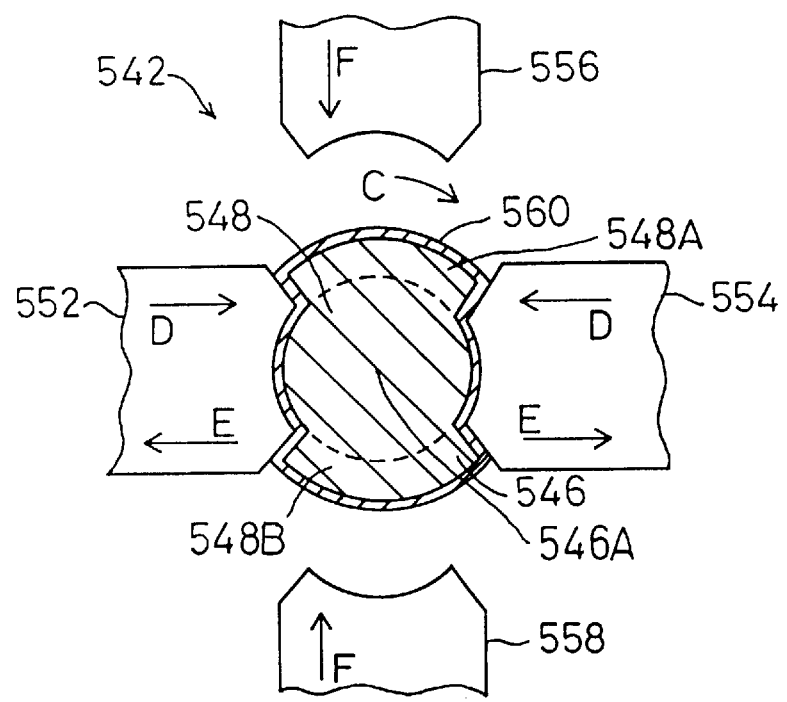
FIGS. 20–23 are explanatory views showing the state of the fuel inlet of FIG. 16 during production.

An example of the producing method of the fuel inlet 501 according to the present embodiment is described with reference to FIGS. 18 to 23. As shown in FIG. 18, the first core portion 548 of the core 546 is inserted through one end of the blank pipe 560, which is a straight pipe having the same diameter as the relatively large diameter portion 512, then the dies 552 and 554 of the press 542 are moved in the pressing directions (the directions indicated by arrows D in FIG. 18) to press the one end of the blank pipe 560 into a configuration corresponding to the first core portion 548 (as shown in FIG. 20).

Next, the dies 552 and 554 of the press 542 are retreated in the direction of the arrows E, and the core 546 is rotated through an angle of 90° in the direction of the arrow C, with the result that the blank pipe 560 under processing is together rotated through an angle of 90° in the direction of the arrow C.

Figure 21:
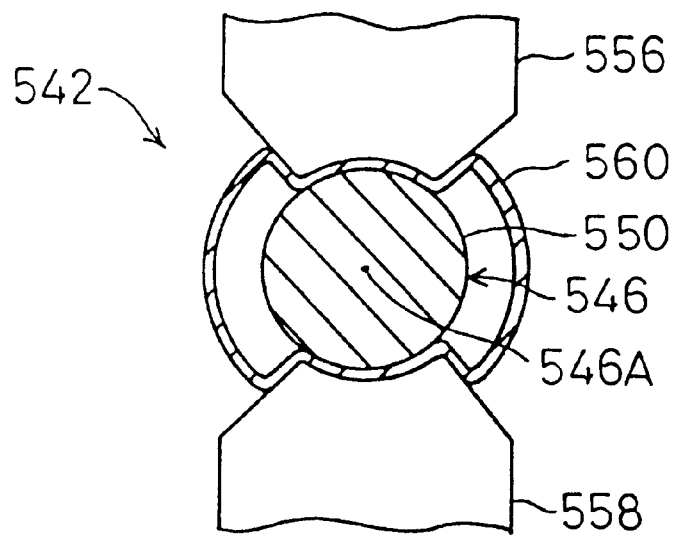

Subsequently, the stopper 556 and 558 of the press 542 are moved in the holding directions (the directions indicated by arrows F in FIG. 20) so as to hold the blank pipe 560 under processing. The core 546 is then moved along the axis 546A such that the second core portion 550 of the core 546 is inserted through the one end of the blank pipe 560 (as shown in FIG. 21).

Figure 22:
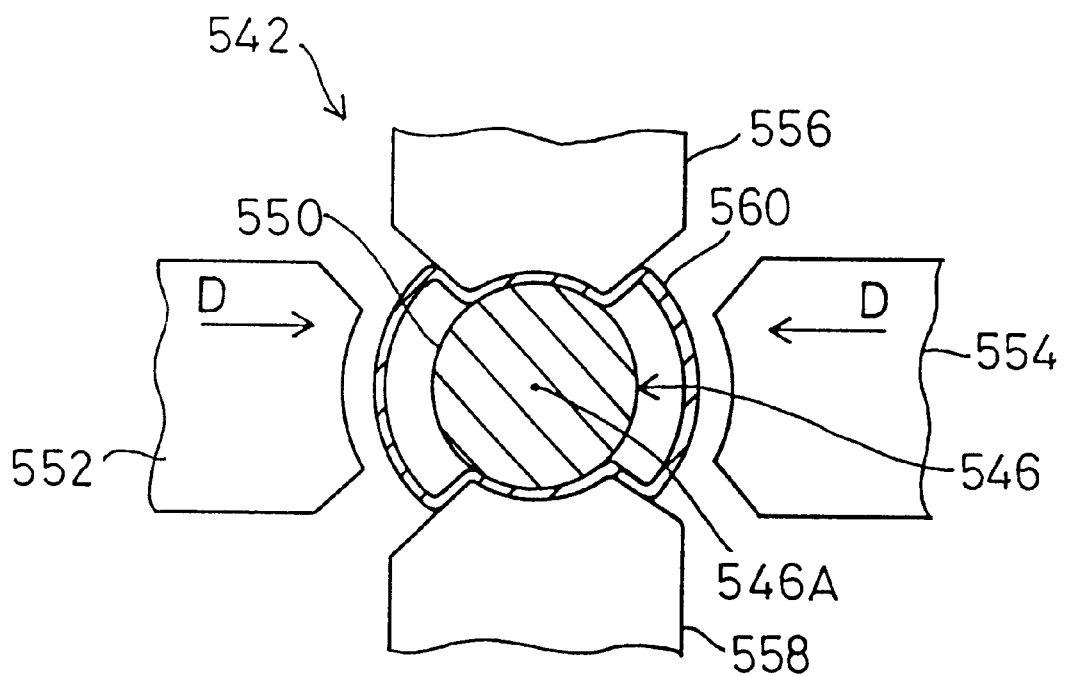
Figure 23:
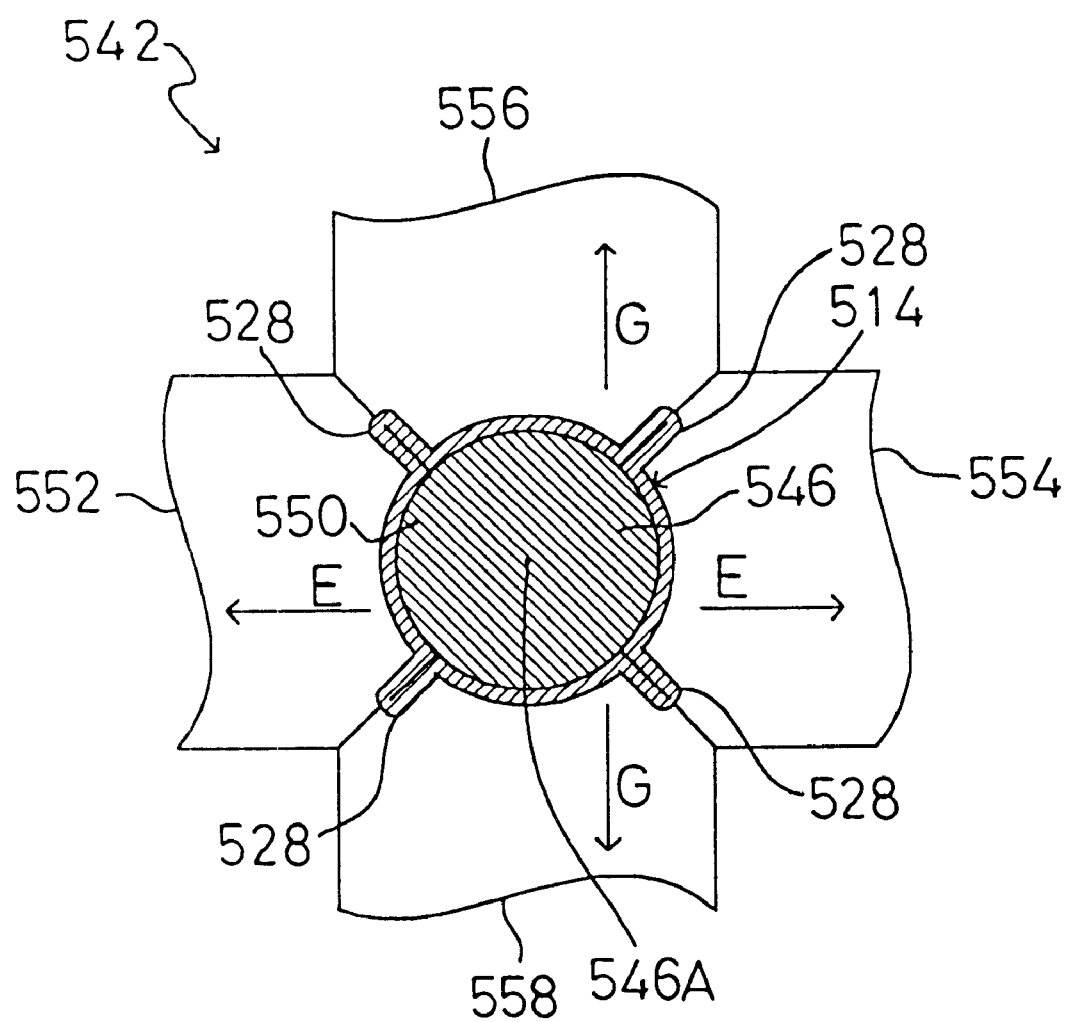

As shown in FIG. 22, the dies 552 and 554 of the press 542 are then moved in the pressing directions (the directions indicated by the arrows D in FIG. 22) to press the one end of the blank pipe 560 into a configuration corresponding to the second core portion 550 (as shown in FIG. 23).

Afterward, as shown in FIG. 23, the dies 552 and 554 of the press 542 are moved in the retreating directions (the directions indicated by the arrows E), the stopper 556 and 558 are moved in the retreating directions (the directions indicated by the arrows G), and the core 546 is pulled out. Thus, the relatively small diameter portion 514 having a decreased diameter by providing four elongate protrusions 518 is completed.

Although the process steps of forming the first taper portion 513 and the second taper portion 515 are omitted to simplify the description in FIGS. 18–23, actually portions of the core 546 in FIG. 19 designed to form the above taper portions 513 and 515 are tapered, respectively, and corresponding portions of the dies 552, 554, 556 and 558 are tapered as well.

Figure 24:
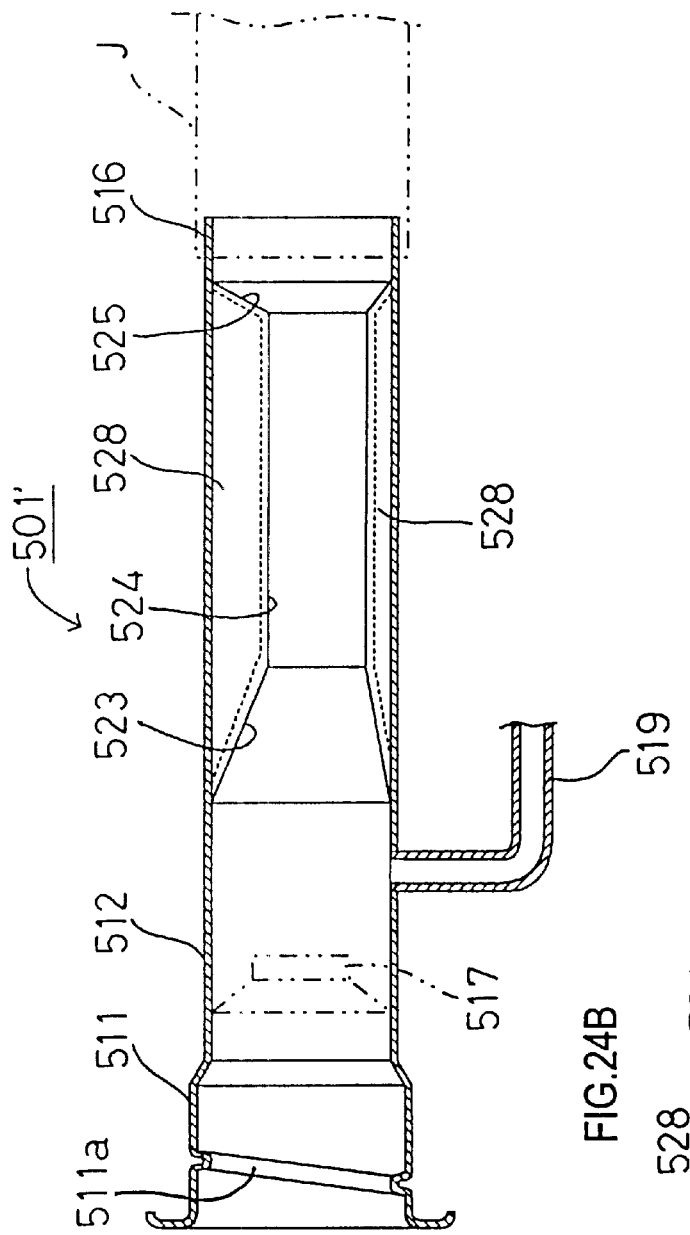
FIG. 24A is a longitudinal cross-sectional view of a modified narrowed fuel inlet.
FIG. 24B is a transverse cross-sectional view of the relatively small diameter portion.

As shown by reference number 501' in FIG. 24A, the axis of the first taper portion 523, the relatively small diameter portion 524 and the second taper portion 525 may be deviated from the axis of the cap attachment portion 511 and the relatively large diameter portion 512. In this case, four elongate protrusions 528 have different heights. Although four elongate protrusions 518 are provided in the above described embodiment, the number of the elongate protrusions 518 is variable. Furthermore, the four elongate protrusions 518 arranged at approximately equal angles in FIG. 17B may be arranged at random.

A modification of the second embodiment is described hereafter.

Figure 25:
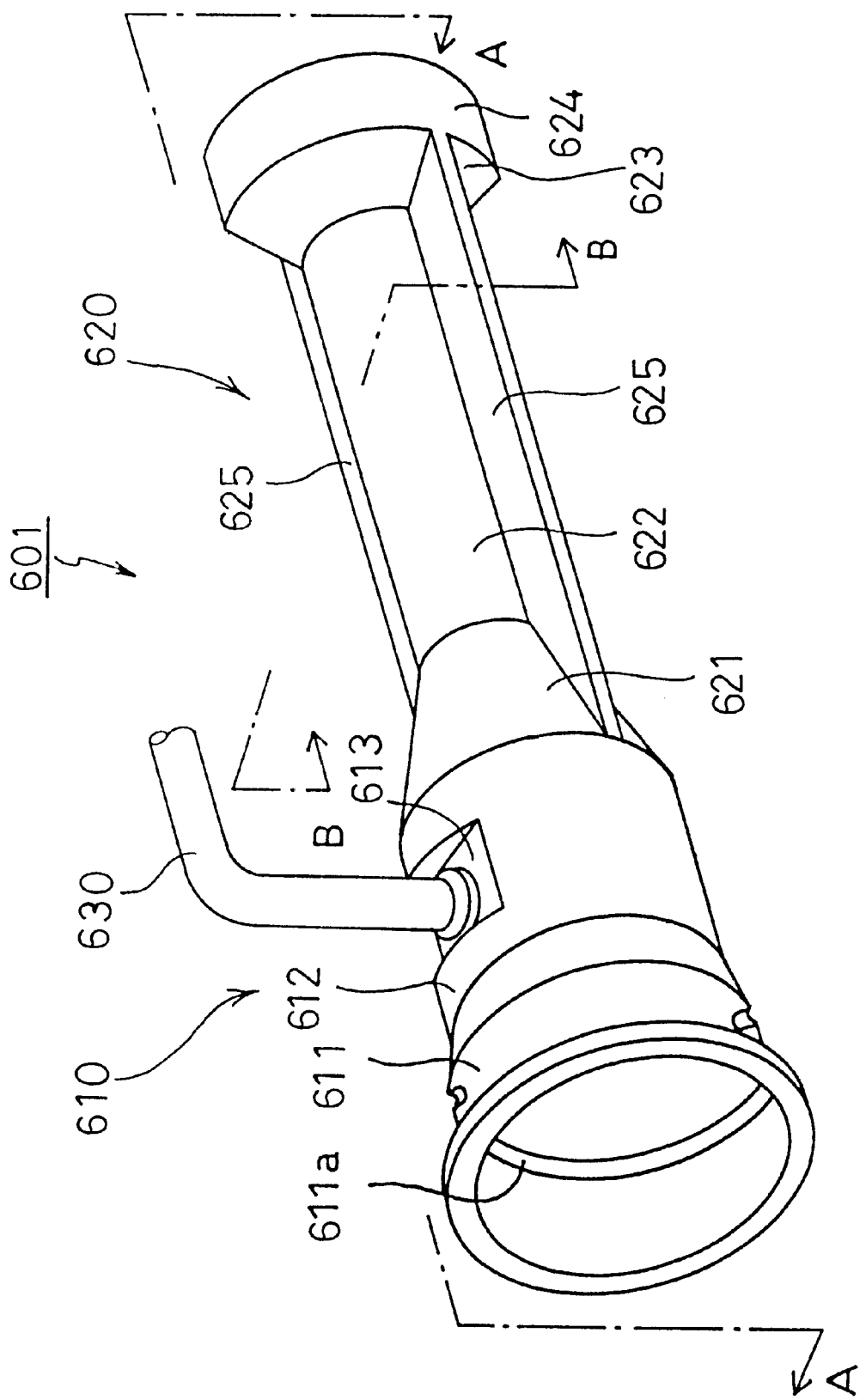
FIG. 25 is a perspective view of a modification of the fuel inlet of the second embodiment.

A fuel inlet 601 shown in FIG. 25 is produced by pressing a pipe (hereinafter referred to as "a blank pipe") which is made by welding the butted edges of two pipes having the same outer diameter and different thicknesses. Specifically, the fuel inlet 601 comprises a mouthpiece portion 610 formed from a pipe having an outer diameter of 42.7 mm and a thickness of 1.2 mm, and a regular portion 620 formed from a pipe having an outer diameter of 42.7 mm and a thickness of 0.5 mm.

The mouthpiece portion 610 comprises a cap attachment portion 611 and a relatively large diameter portion 612. The cap attachment portion 611 is formed by expanding one end of the blank pipe to ϕ50 mm by bulging and provided with a spiral groove 611a for fixing a screw cap thereon.

The relatively large diameter portion 612 is made of the blank pipe unprocessed and provided with a flat portion 613 in the upper part for connecting one end of a breather tube 630 thereto.

The regular portion 620 comprises a first taper portion 621, a relatively small diameter portion 622 (outer diameter: 25.4 mm), a second taper portion 623, and a connecting portion 624 (outer diameter: 42.7 mm) The method of producing the fuel inlet 601 will now be described.

Figure 26A:
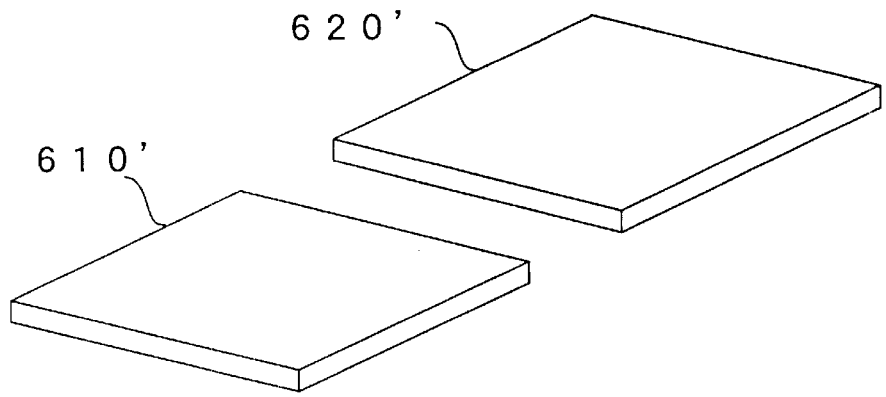
FIGS. 26A–26C and FIGS. 27A–27D are schematic explanatory views showing how to produce the fuel inlet of FIG. 25 using plates having different thicknesses.
Figure 26B:
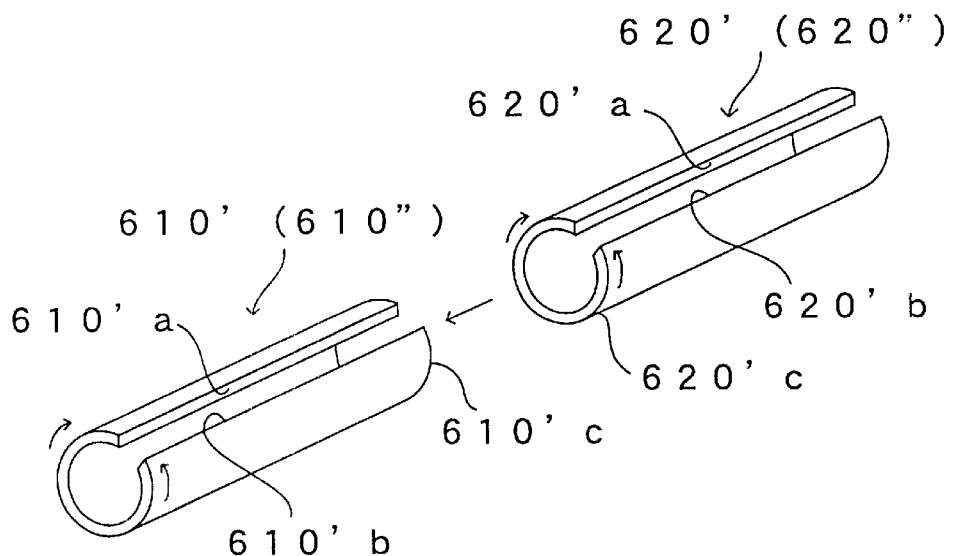
Figure 26C:
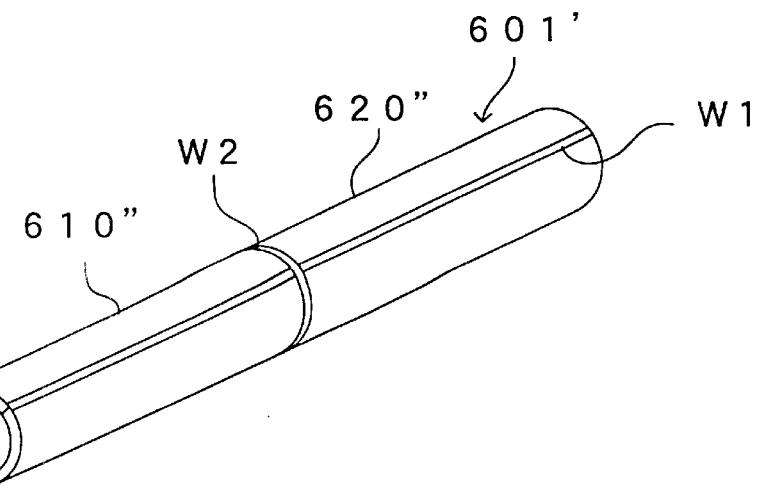

A blank pipe 601' for producing the fuel inlet 601 is produced as follows:

Firstly prepared are a plate 610' with a thickness of 1.2 mm for forming the mouthpiece portion 610 and a plate 620' with a thickness of 0.5 mm for forming the regular portion 620 (FIG. 26A). These plates 610' and 620' are rolled up to form pipes 610" and 620", respectively, with respective edges of 610'a and 610'b, and 620'a and 620'b butting each other (FIG.26B). Then, the pipes 610" and 620" are aligned such that the above butting edges form the same straight line, while respective edges 610'c and 620'c in the longitudinal direction are abutted. Subsequently, welding W1 is performed at the respective butting areas along the above-mentioned straight line, then welding W2 is performed at the abutting area in the circumferential direction to complete the blank pipe 601' (FIG. 26C).

According to the above-mentioned method of producing the blank pipe 601', the blank pipe 601' is made by joining two pipes 610" and 620" having different thicknesses, respectively. Therefore, the mouthpiece portion 610 and the regular portion 620 required to have different thicknesses, respectively, can be processed at the same time in the producing process of the fuel inlet described below, with the result that saving of production costs due to the reduction of process steps is achieved.

In the above-described producing method of the blank pipe 601', it is preferable to configure the welding control program such that weldings W1 and W2 are performed at the same process step. This can shorten the whole time required for producing the blank pipe 601' and therefore enhance production efficiency. In respect of welding, various ways such as laser welding and seam welding may be employed.

The process of producing a fuel inlet using the above blank pipe 601' will now be described.

Figure 27A:
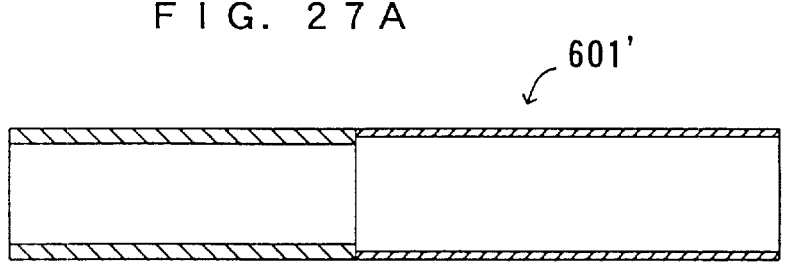
Figure 27B:
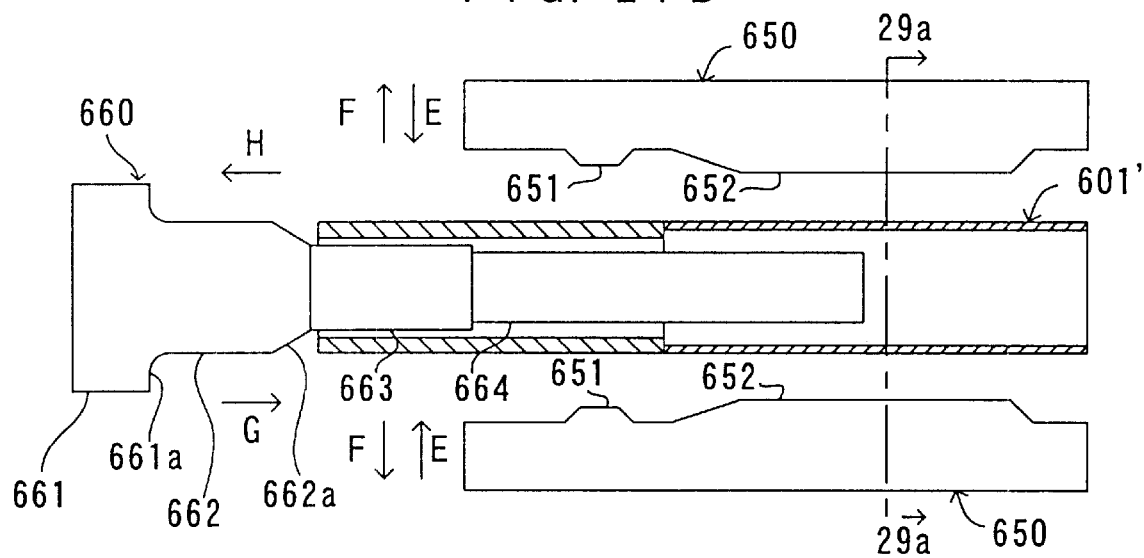

The blank pipe 601' produced as above (FIG. 27A) is placed in a press (FIG. 27B). The press is provided with outer dies 650 for forming the outer configuration of the fuel inlet and an inner die 660 for pressing the blank pipe 601' between the outer dies 650 and itself.

The outer dies 650 are a pair of upper and lower dies, each of which is provided with a mouthpiece portion forming part 651 and a regular portion forming part 652.

Figure 28:
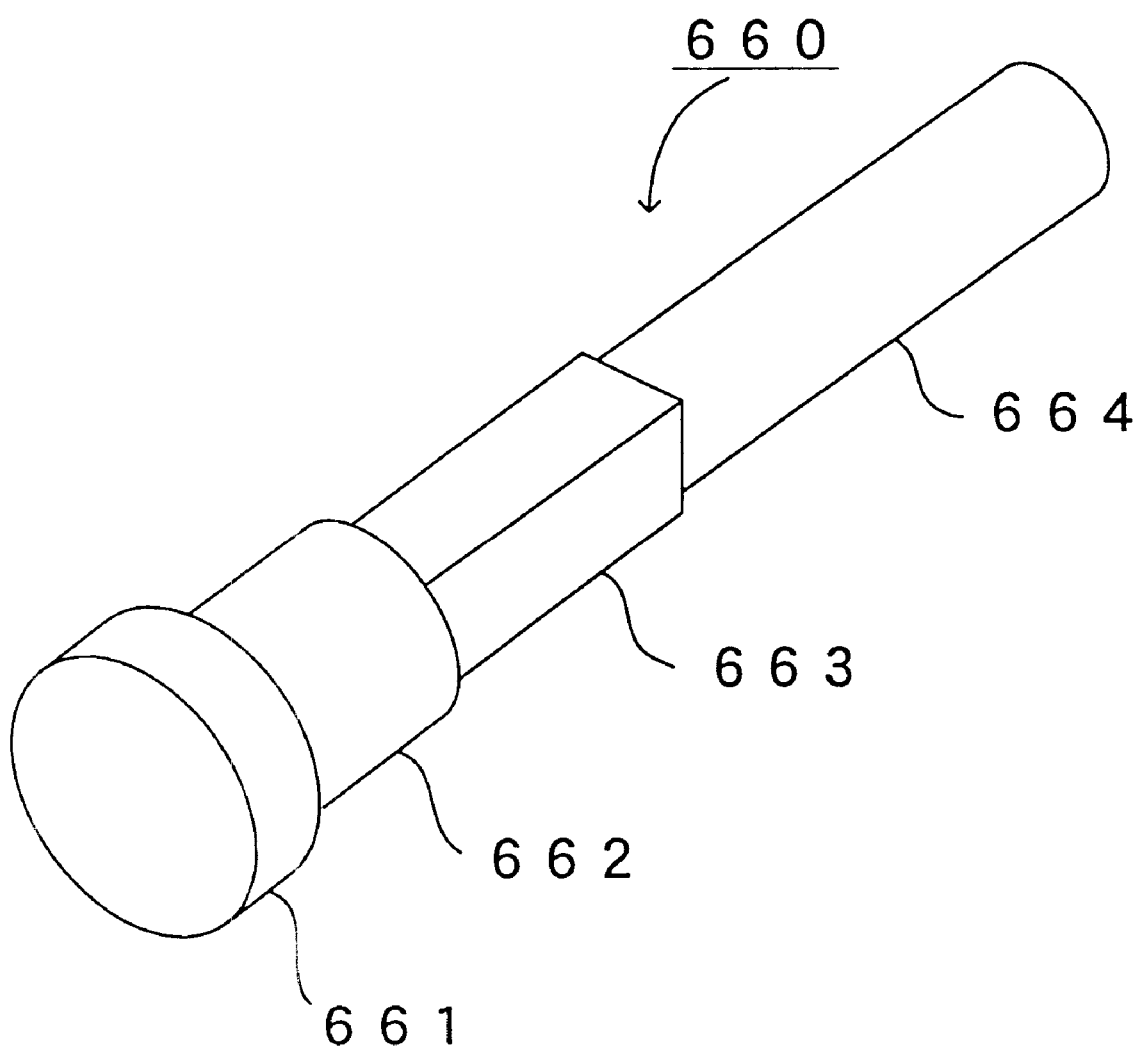
FIG. 28 is a perspective view of an inner die used for producing the fuel inlet of FIG. 25.

The inner die 660, as shown in FIG. 28, comprises a cap attachment portion holding part 661 and a cap attachment portion forming part 662 for forming the cap attachment portion 611, a flat portion forming part 663 for forming the flat portion 613, and a relatively small diameter portion forming part 664 for forming the relatively small diameter portion 622, all of which are integrated.

The cap attachment portion forming part 662 has an outer diameter larger than the inner diameter of the blank pipe 601' in order to expand one end of the blank pipe 601' by bulging. The downstream end of the cap attachment portion forming part 662 is tapered to enable easy thrust thereof into the blank pipe 601'. The cap attachment portion holding part 661 is formed into a disk-like configuration having an outer diameter larger than that of the cap attachment portion forming part 662, and its downstream end surface 661a is pressed on one end of the blank pipe 601' so as to warp the end to a desired extent and form a fuel port. The flat portion forming part 663 has a rectangular parallelepiped configuration, the upper surface of which is flat so as to form the flat portion 613. The relatively small diameter portion forming part 664 has a cylindrical configuration, the outer diameter of which is equal to the inner diameter of the relatively small diameter portion.

In the producing process, the blank pipe 601' is held in the press with a not shown holding mechanism, and the inner die 660 is moved by a not shown driving means in the direction G (the pressing direction) in FIG. 27B to be inserted into the blank pipe 601', with the relatively small diameter portion forming part 664 at the front (FIG. 27B). When the cap attachment portion forming part 662 of the inner die 660 reaches the upstream end of the blank pipe 601', the taper portion 662a is further thrust into the blank pipe 601', while expanding the end. During this process, the upstream end of the blank pipe 601' is expanded to form the cap attachment portion 611. Subsequently, the end surface 661a of the cap attachment holding portion 661 is pressed on the end of the blank pipe 601', with the result that the end is warped to a desired extent, and then the insertion of the inner die 660 is stopped.

Figure 27C:
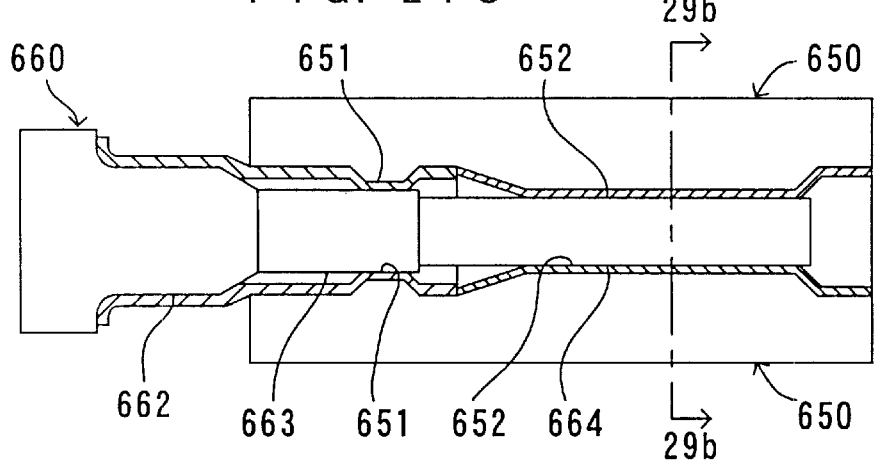

Next, the outer dies 650 are moved by a not shown driving means in the direction E (the pressing direction) in FIG. 27B to press the blank pipe 601' in cooperation with the inner die 660 (FIG. 27C). The details of this process are shown in FIGS. 29A and 29B, which are sectional views taken along line 29a—29a of FIG. 27B and line 29b—29b of FIG. 27C, respectively.

Figure 29A:
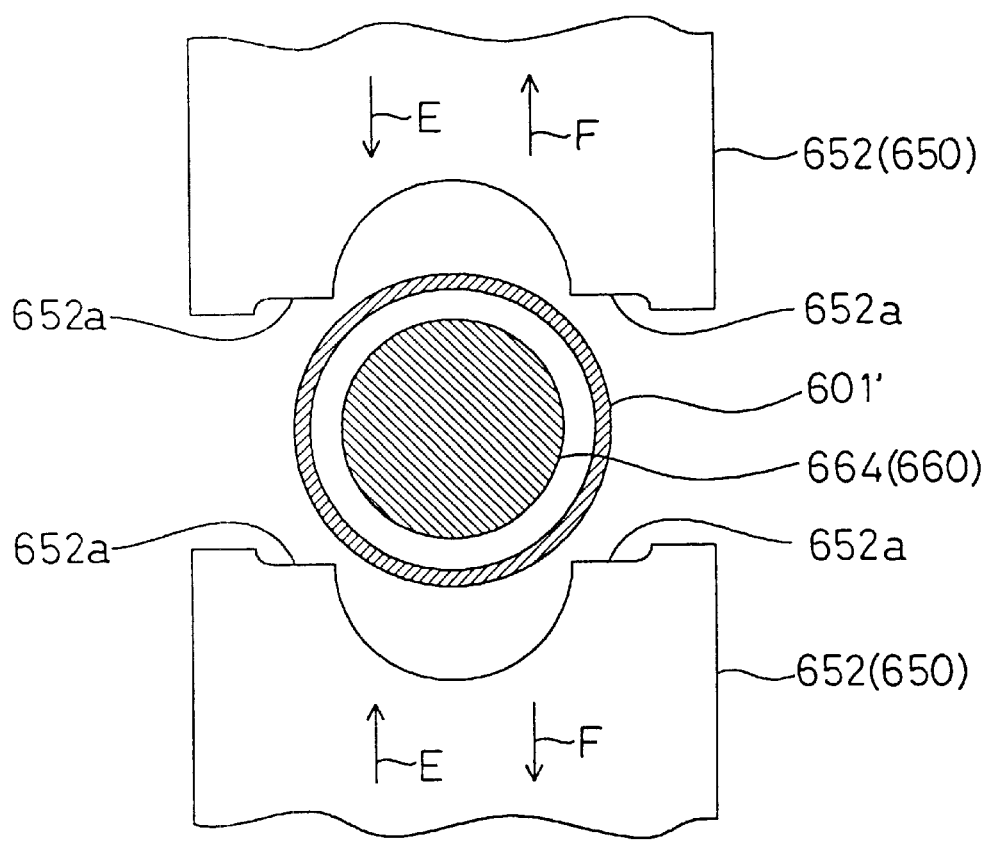
FIGS. 29A and 29B are explanatory views showing the state of the fuel inlet of FIG. 25 during production.
Figure 29B:
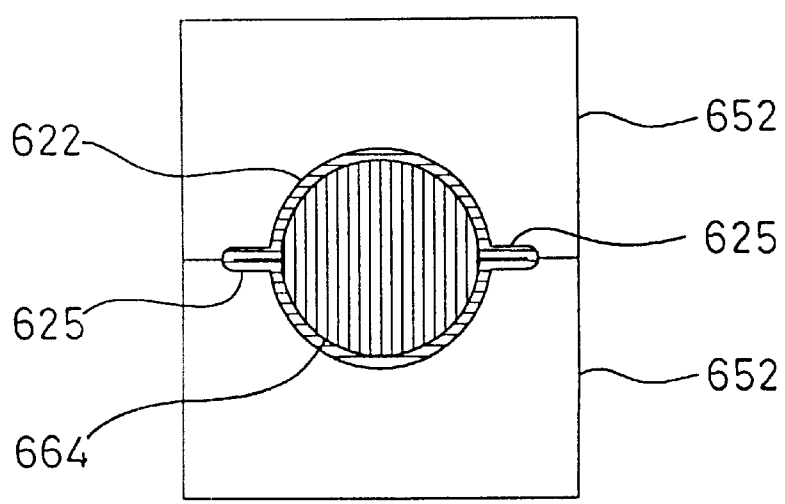

As shown in FIG. 29A, the regular portion forming parts 652, 652 of the outer die 650 are moved in the direction E (the pressing direction), while the blank pipe 601' is disposed coaxially with the relatively small diameter portion forming part 664 of the inner die 660. The regular portion forming parts 652, 652 press the blank pipe 601' in the upward and downward directions, while receiving and pressing the excess thickness portions of the blank pipe 601', which are formed during the above process, within elongate protrusion forming parts 652a. When the regular portion forming parts 652, 652 of the outer dies 650 abut each other, formation of the relatively small diameter portion 622 having the elongate protrusions 625 is completed as shown in FIG. 29B.

At the same time, the mouthpiece portion forming parts 651, 651 of the outer dies 650 press the blank pipe 601' in the upward and downward directions in cooperation with the flat portion forming part 663 of the inner die 660, and the flat portion 613 to which one end of a breather tube is joined is formed.

Figure 27D:
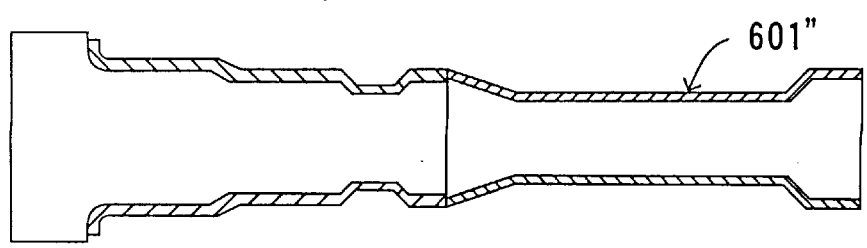

After a workpiece 601" of the fuel inlet is formed as above, the outer dies 650, 650 of the press are moved in the retreating directions (the directions indicated by the arrows F of FIG. 27B), while the inner die 660 is moved in the retreating direction (the direction indicated by the arrow H of FIG. 27B), as shown in FIG. 27D.

In FIGS. 25 through 29B, the steps of forming the first taper portion 621 and the second taper portion 623 are omitted to simplify the description. Actually, however, formation of these taper portions is simultaneous with the formation of the elongate protrusions 625 and the like during the above-described press working because parts of the outer dies 650, 650 corresponding to the taper portions have taper configurations.

Finally, a breather tube 630 is fixed to the workpiece 601" to complete the fuel inlet 601.

Figure 30:
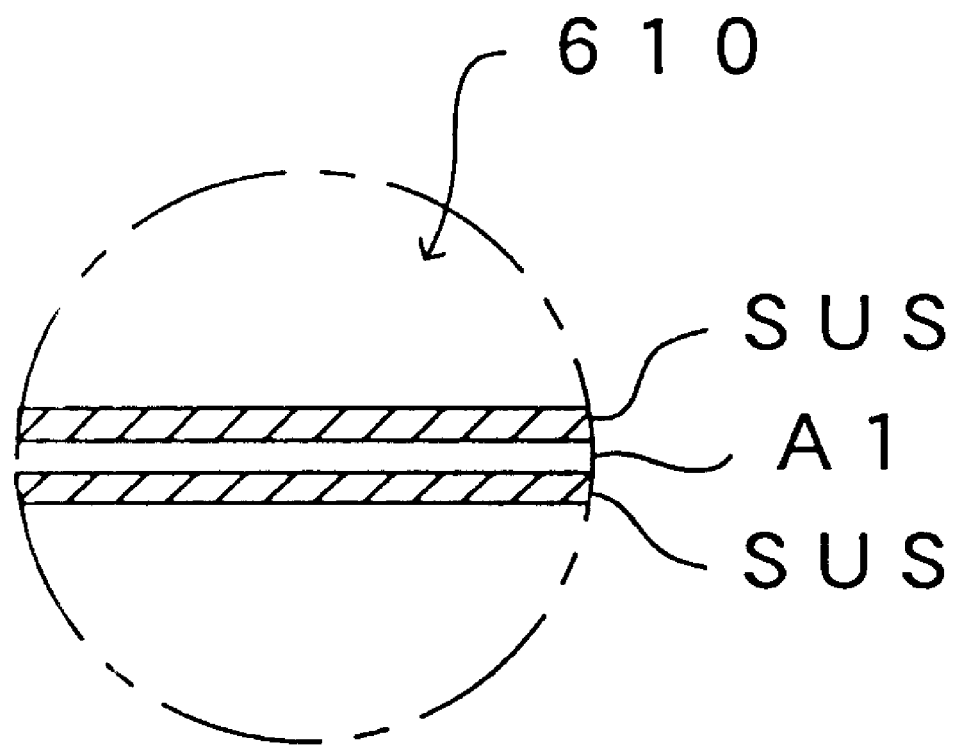
FIG. 30 is a detailed explanatory view showing the cross section of a mouthpiece portion of the fuel inlet of FIG. 25.

The mouthpiece portion 610 is preferably made of a pipe having three layers, i.e. a stainless layer (SUS), an aluminum layer, and another stainless layer (SUS) in order from the outside, as shown in FIG. 30. The stainless layers are provided aiming for anticorrosiveness and wear resistance, and the aluminum layer is provided aiming at reducing the weight of the pipe.

Although crushing with the press is employed in the above embodiment for narrowing the pipe during the formation of the relatively small portion, the pipe may by narrowed by upsetting such as swaging.

Furthermore, the relatively small diameter portion of the fuel inlet according to the first embodiment may be formed by narrowing the pipe using the above-described method.

What is claimed is:

1. A fuel inlet for connection to a fuel tank and forming a liquid seal when supplying fuel to the fuel tank, the fuel inlet comprising:

an inlet pipe for supplying fuel into a fuel tank, a first end of the inlet pipe being expanded to have a diameter of one and a half to three times as large as a diameter of a body of the inlet pipe, and the first end of the inlet pipe having a spiral groove formed directly therein for engagement with a removable fuel cap having a mating spiral arrangement;

an intermediate portion of the inlet pipe having an attachment portion with a breather hole provided therein, and the intermediate portion forming a constriction in the fuel inlet; and a breather tube having a first end with a flange which is projection welded to the attachment portion of the inlet pipe, around the breather hole, to facilitate communication between the breather tube and the inlet pipe, and a second end of the breather tube being connectable with the fuel tank for allowing air to flow from the fuel tank toward the intermediate portion of the inlet pipe as fuel is supplied to the fuel tank via the inlet pipe.

2. The fuel inlet account to claim 1, wherein the attachment portion, surrounding the breather hole, is flat.

3. The fuel inlet account to claim 2, wherein a surface of the inlet pipe, opposite the attachment portion, is also flat.

4. The fuel inlet according to claim 1, wherein at least one of the inlet pipe and the breather tube is manufactured from a metallic material selected from the group comprising SUS304, SUS304L and SUS436 according to a Japanese Industrial Standards.

5. A fuel inlet for connection to a fuel tank and forming a liquid seal when supplying fuel to the fuel tank, the fuel inlet comprising:

an inlet pipe for supplying fuel into a fuel tank;

a cylindrical reinforcement located within and overlapping an inner circumference of the inlet pipe in a vicinity of a fuel port thereof;

a spiral groove formed in both the inlet pipe and the cylindrical reinforcement for engagement with a removable fuel cap having a mating spiral arrangement;

an intermediate portion of the inlet pipe having an attachment portion with a breather hole provided therein, and the intermediate portion forming a constriction in the fuel inlet; and a breather tube having a first end with a flange which is projection welded to the attachment portion of the inlet pipe, around the breather hole, to facilitate communication between the breather tube and the inlet pipe, and a second end of the breather tube being connectable with the fuel tank for allowing air to flow from the fuel tank toward the intermediate portion of the inlet pipe as fuel is supplied to the fuel tank via the inlet pipe.

6. The fuel inlet according to claim 5, wherein a downstream end of the cylindrical reinforcement has an interference portion formed by narrowing the fuel tank side opening thereof such that only a fuel feeding nozzle for lead-free gasoline can be inserted through the narrow of the fuel tank side opening.

7. The fuel inlet account to claim 5, wherein the attachment portion, surrounding the breather hole, is flat and a surface of the inlet pipe, opposite the attachment portion, is also flat.

8. The fuel inlet account to claim 5, wherein at least one of the inlet pipe and the breather tube is manufactured from a metallic material selected from the group comprising SUS304, SUS304L and SUS436 according to a Japanese Industrial Standards.

9. A fuel inlet forced into a fuel inlet supporting hole provided in a vehicle body so as to be fixedly secured therein to allow with relative movement between the fuel inlet and the car body, the fuel inlet comprising:

a first end of the fuel inlet defining an opening for receiving a fuel nozzle and a second end of the fuel inlet being connectable with a fuel tank;

an extending portion extending radially outward from an edge of the first end of the inlet pipe; and an outer-cylinder-like flange formed integral with the extending portion and the outer-cylinder-like flange extending in an axial direction away from the first end toward the second end of the inlet pipe to surround a portion of first end of the fuel inlet; and the outer-cylinder-like flange being force fixed to the fuel inlet supporting hole to be fixedly secured thereto.

10. The fuel inlet according to claim 9, wherein the fuel inlet forms a liquid seal when supplying fuel to the fuel tank, the fuel inlet comprising:

a first end of the inlet pipe being expanded to have a diameter of one and a half to three times as large as a diameter of a body of the inlet pipe, and the first end of the inlet pipe having a spiral groove formed directly therein for engagement with a removable fuel cap having a mating spiral arrangement;

an intermediate portion of the inlet pipe having an attachment portion with a breather hole provided therein, and the intermediate portion forming a constriction in the fuel inlet; and a breather tube having a first end with a flange which is projection welded to the attachment portion of the inlet pipe, around the breather hole, to facilitate communication between the breather tube and the inlet pipe and a second end of the breather tube being connectable with the fuel tank for allowing air to flow from the fuel tank toward the intermediate portion of the inlet pipe as fuel is supplied to the fuel tank via the inlet pipe.

11. The fuel inlet according to claim 10, wherein the outer-cylinder-like flange is provided with at least one slit such that the outer-cylinder-like flange is elastically deformable in a radial direction.

12. The fuel inlet according to claim 10, wherein a space enclosed by the outer-cylinder-like flange is filled with an oscillation absorbing material.

13. A fuel inlet supported by a vehicle body, the fuel inlet forming a liquid seal when supplying fuel to a fuel tank, the fuel inlet comprising:

a first end of the fuel inlet defining an opening for receiving a fuel nozzle and a second end of the fuel inlet being connectable with a fuel tank, and an inlet pipe being manufactured from a metallic material selected from the group comprising SUS304, SUS304L and SUS436 according to a Japanese Industrial Standards;

a first end of the inlet pipe being expanded to have a diameter of one and a half to three times as large as a diameter of a body of the inlet pipe;

an extending portion extending radially outward from an edge of the first end of the inlet pipe;

an outer-cylinder-like flange formed integral with the extending portion and the outer-cylinder-like flange extending in an axial direction away from the first end toward the second end of the inlet pipe to surround a portion of first end of the fuel inlet;

a cylindrical reinforcement located within and overlapping an inner circumference of the inlet pipe in a vicinity of a fuel port thereof;

an intermediate portion of the inlet pipe has an attachment portion with a breather hole provided therein, and the intermediate portion forms a constriction in the fuel inlet;

a breather tube having a first end with a flange which is projection welded to the attachment portion of the inlet pipe, around the breather hole, to facilitate communication between the breather tube and the inlet pipe and a second end of the breather tube being connectable with the fuel tank for allowing air to flow from the fuel tank toward the intermediate portion of the inlet pipe as fuel is supplied to the fuel tank via the inlet pipe;

a spiral groove formed in the first end of the fuel inlet and the cylindrical reinforcement and the spiral groove facilitating engagement with a removable fuel cap having a mating spiral arrangement; and the outer-cylinder-like flange being force fixed to a fuel inlet supporting hole formed in the vehicle body to be fixedly secured thereto.

14. A fuel inlet for connection to a fuel tank and forming a liquid seal when supplying fuel to the fuel tank the fuel inlet comprising:

a relatively large diameter portion formed on a fuel port side of the fuel inlet; and a relatively small diameter portion on aside of the fuel inlet communicating with the fuel tank, and the relatively small diameter portion being formed integrally with the relatively large diameter portion; and the relatively small diameter portion having a diameter smaller than the relatively large diameter portion, and the relatively small diameter portion including a plurality of elongate protrusions formed by crimping the fuel inlet inwardly.

15. The fuel inlet according to claim 14, wherein a first end of the inlet pipe is expanded to form the relatively large diameter portion which has a diameter of one and a half to three times as large as a diameter of the relatively small diameter portion of the inlet pipe;

an intermediate portion of the inlet pipe has an attachment portion with a breather hole provided therein, and the intermediate portion forms a constriction in the fuel inlet; and a breather tube has a first end with a flange which is protection welded to the attachment portion of the inlet pipe, around the breather hole, to facilitate communication between the breather tube and the inlet pipe, and a second end of the breather tube is connectable with the fuel tank for allowing air to flow from the fuel tank toward the intermediate portion of the inlet pipe as fuel is supplied to the fuel tank via the inlet pipe.

16. The fuel inlet according to claim 14, wherein the diameter of the relatively large diameter portion is at least one and a half times as large as the diameter of the relatively small diameter portion.

17. The fuel inlet according to claim 14, wherein the relatively large diameter portion of the inlet pipe is provided with a spiral groove formed directly therein for engagement with a removable fuel cap having a mating spiral arrangement.

\* \* \* \* \*